Nov. 24, 1942.   J. J. McGINLEY   2,303,057
METHOD AND MEANS FOR MAKING NECKTIES
Filed Dec. 13, 1939   15 Sheets-Sheet 1

INVENTOR
JAMES J. McGINLEY
BY
ATTORNEY

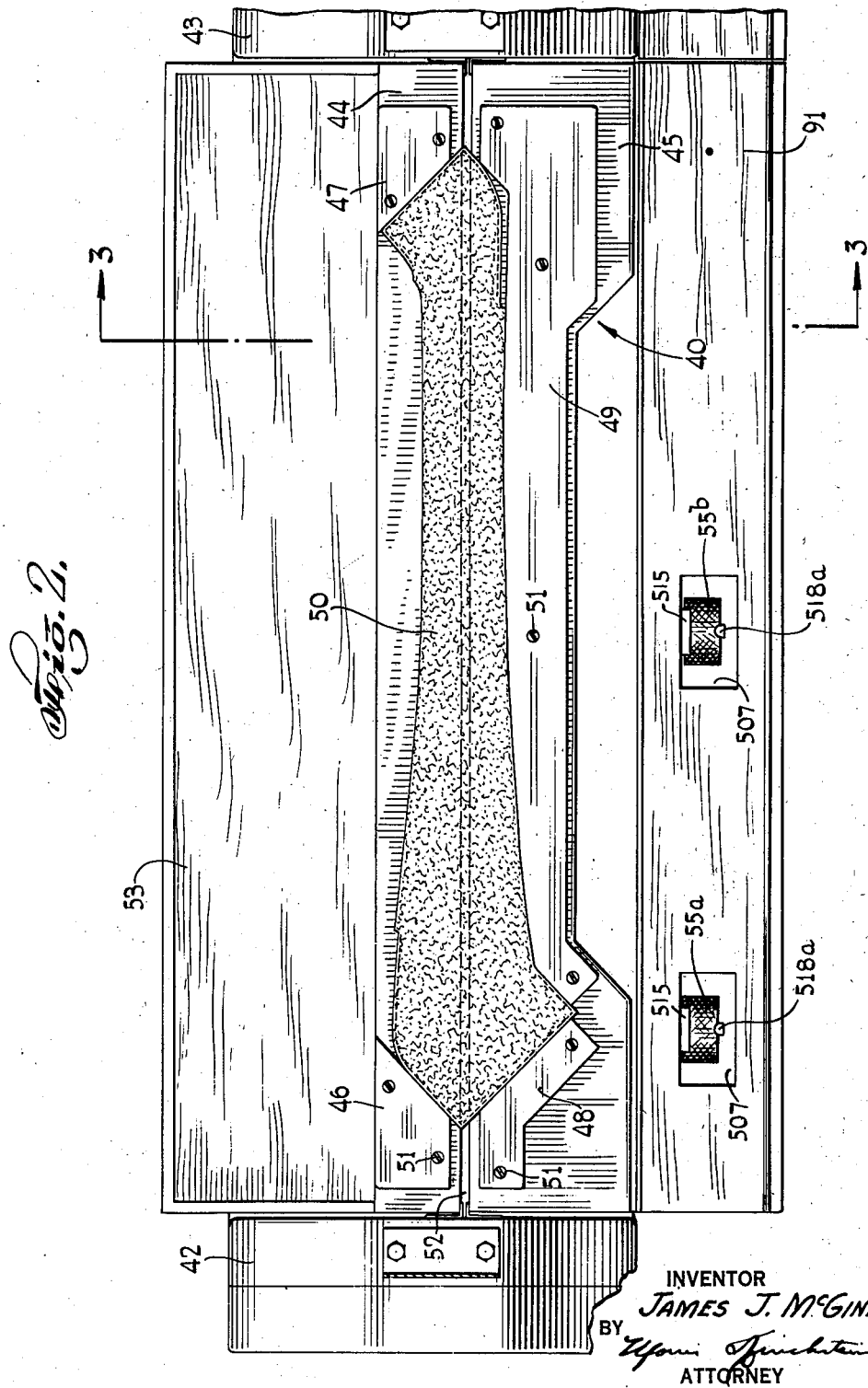

Nov. 24, 1942.  J. J. McGINLEY  2,303,057
METHOD AND MEANS FOR MAKING NECKTIES
Filed Dec. 13, 1939  15 Sheets-Sheet 3
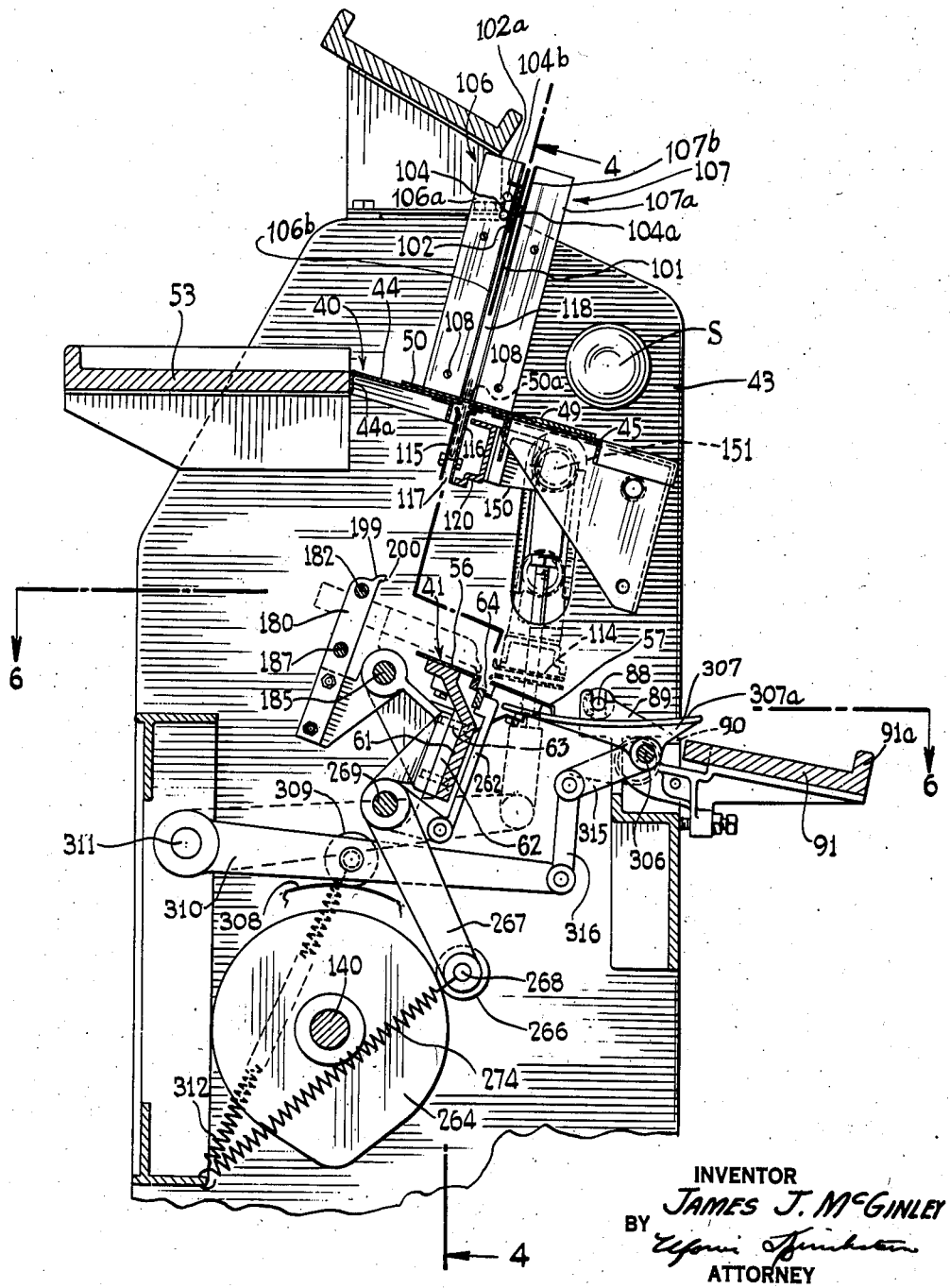
INVENTOR
JAMES J. McGINLEY
BY
ATTORNEY

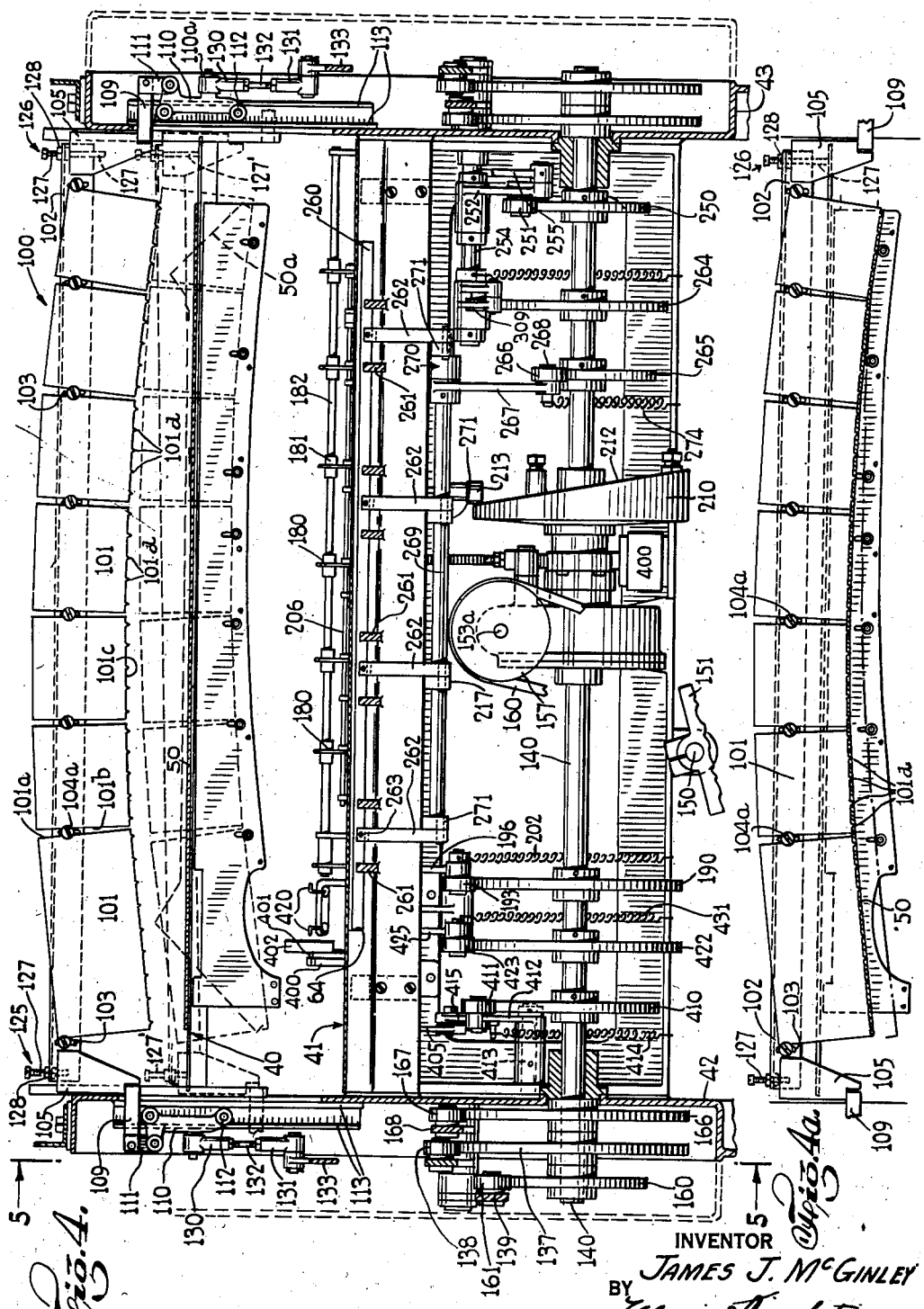

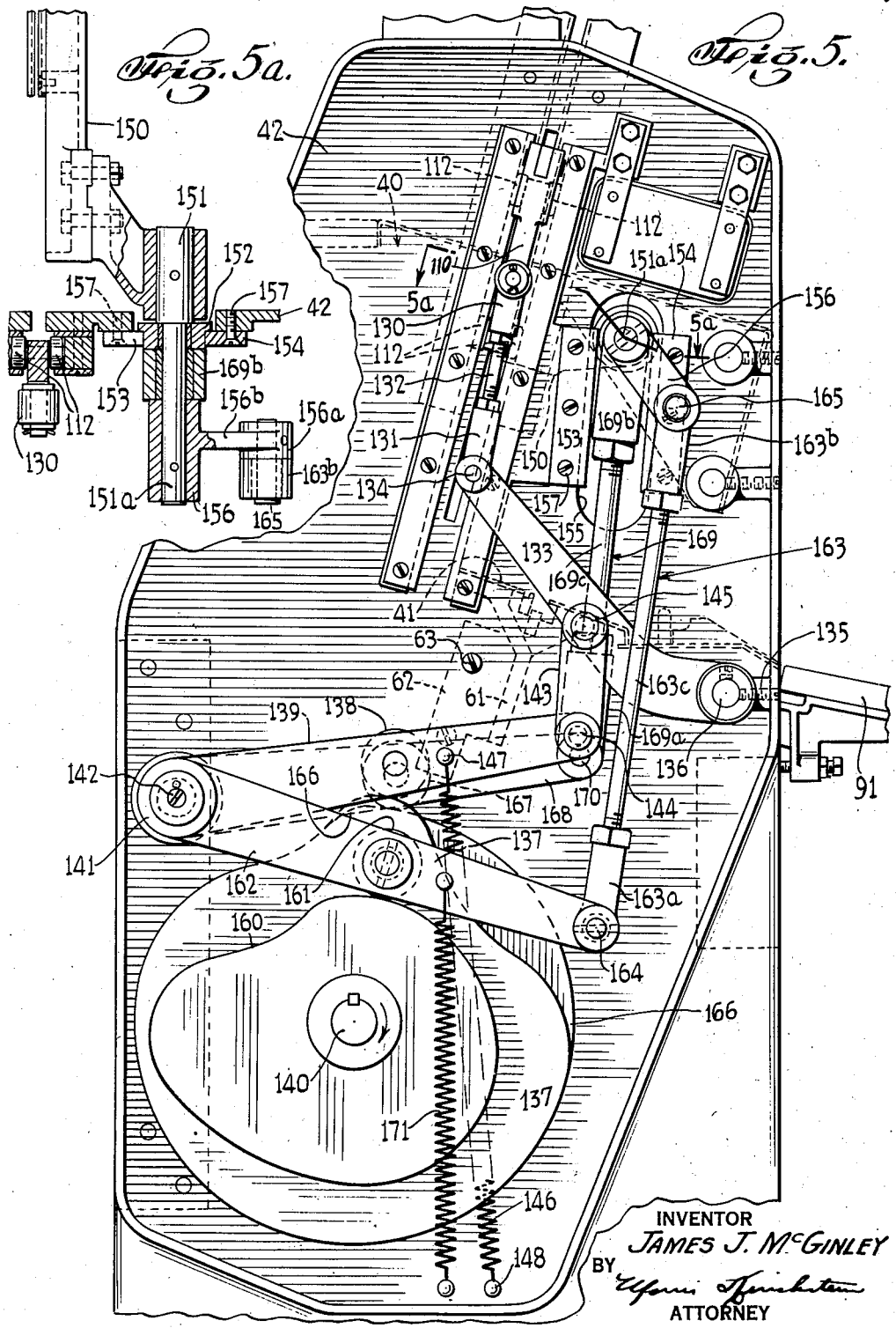

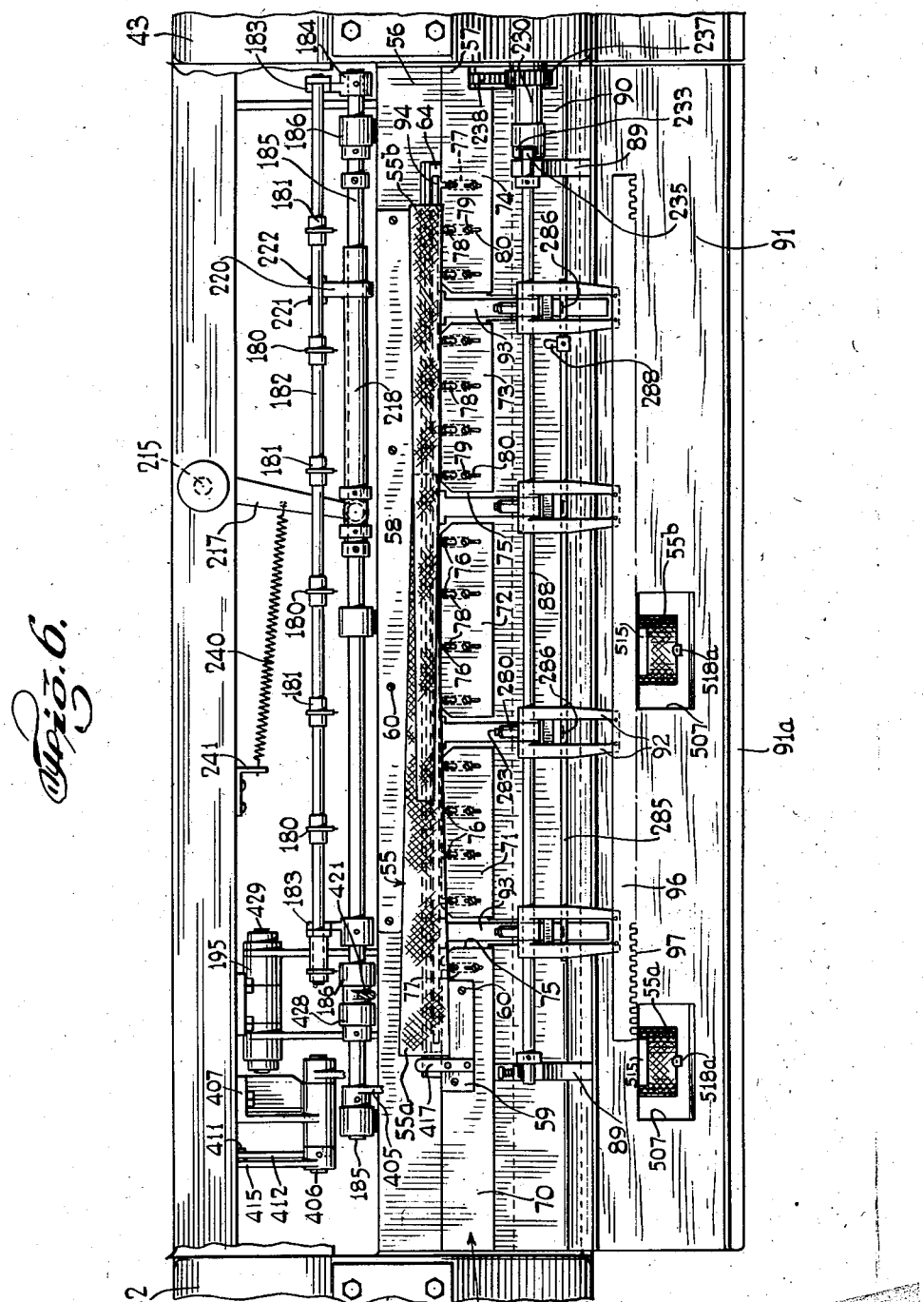

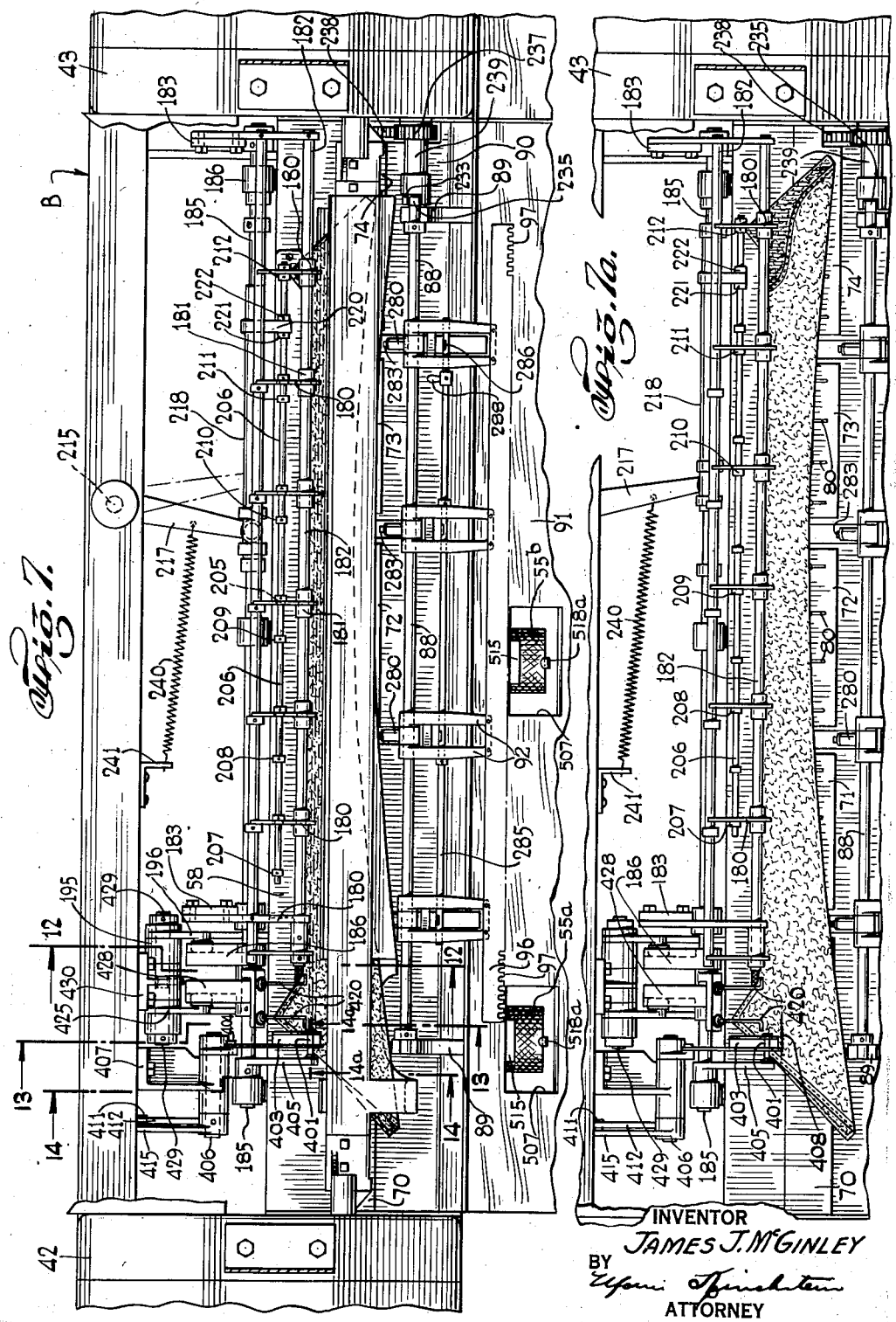

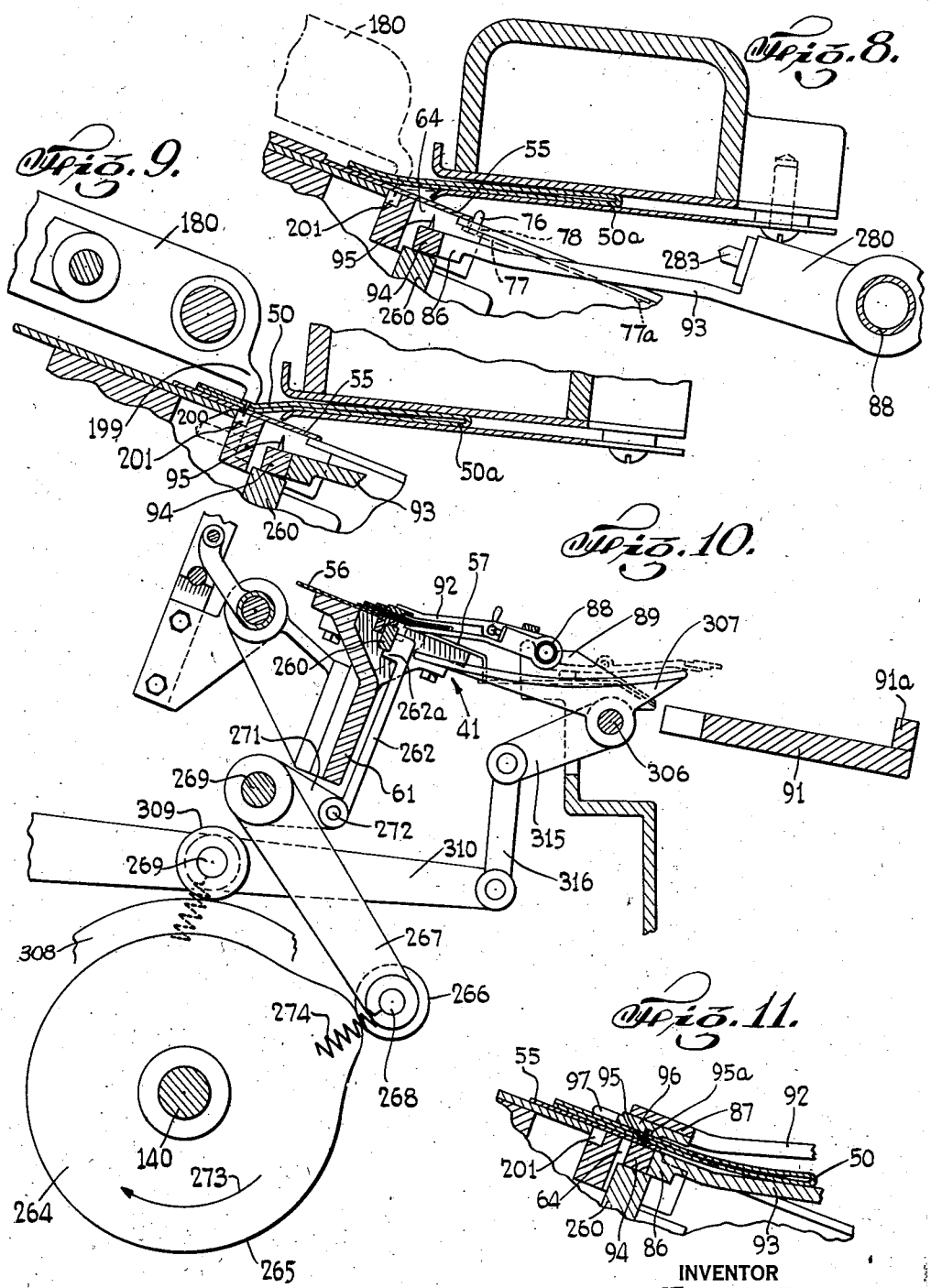

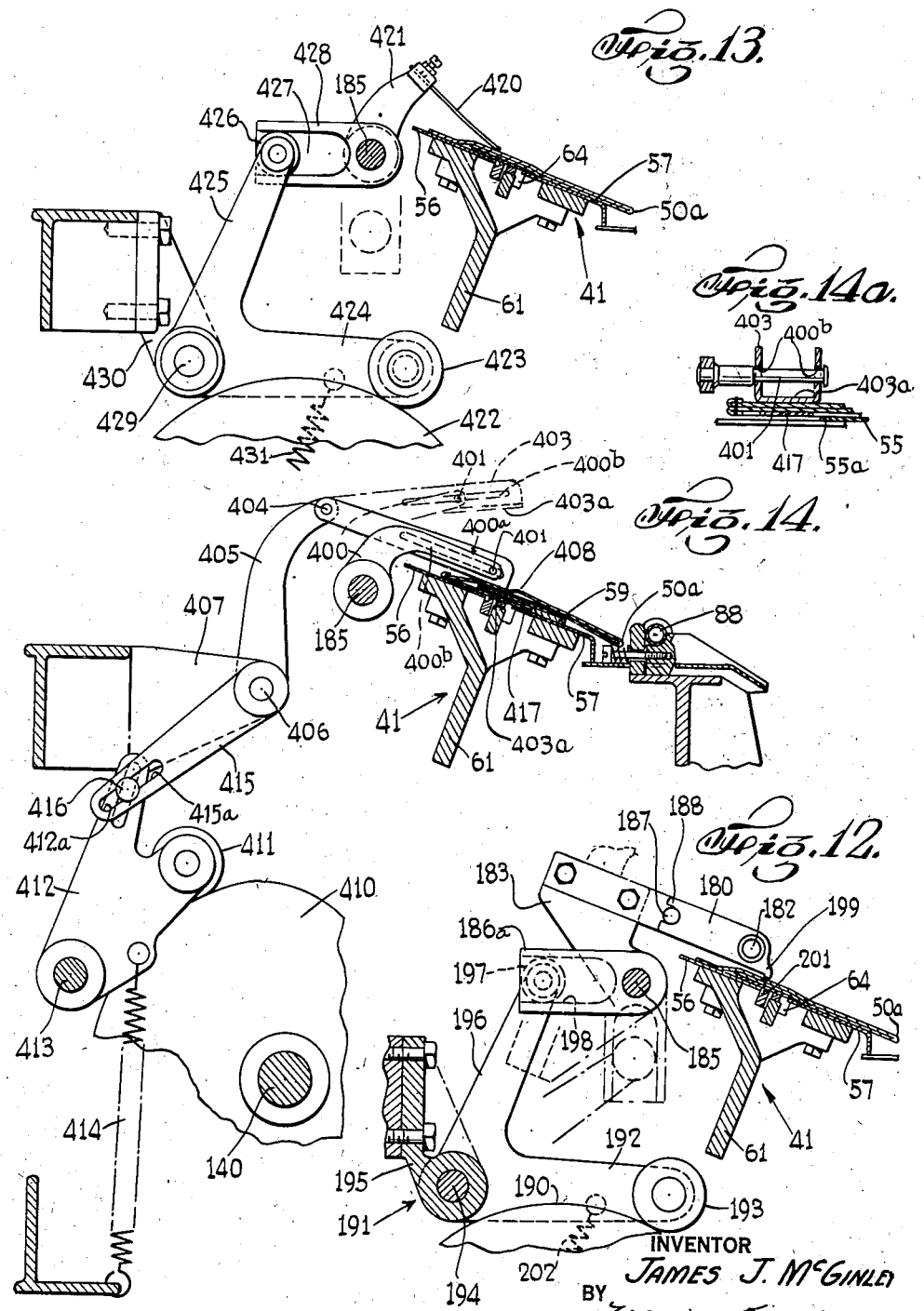

Nov. 24, 1942. J. J. McGINLEY 2,303,057
METHOD AND MEANS FOR MAKING NECKTIES
Filed Dec. 13, 1939 15 Sheets-Sheet 10
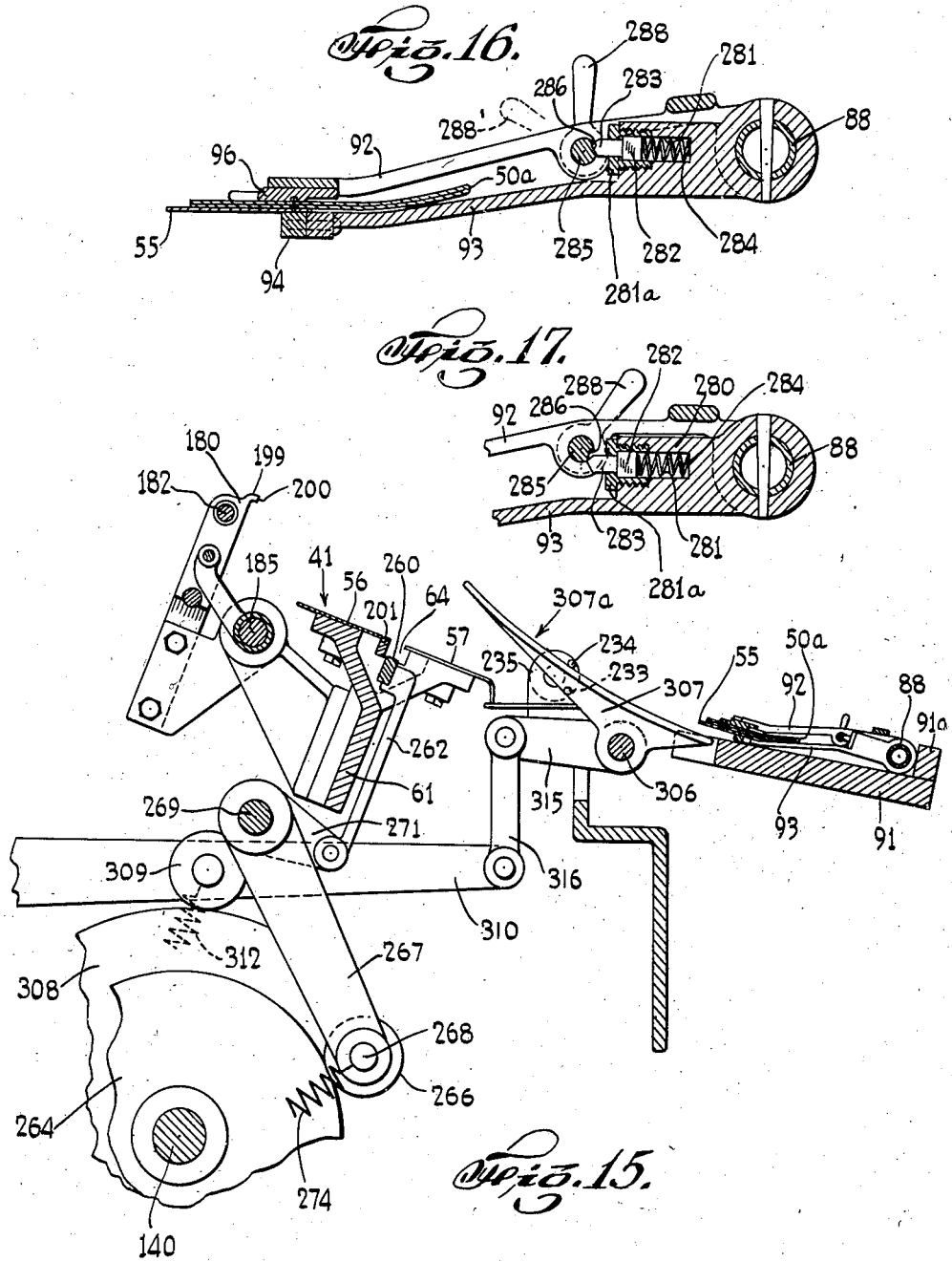
INVENTOR
JAMES J. McGINLEY
BY
ATTORNEY Nov. 24, 1942. J. J. McGINLEY 2,303,057
METHOD AND MEANS FOR MAKING NECKTIES
Filed Dec. 13, 1939 15 Sheets-Sheet 11
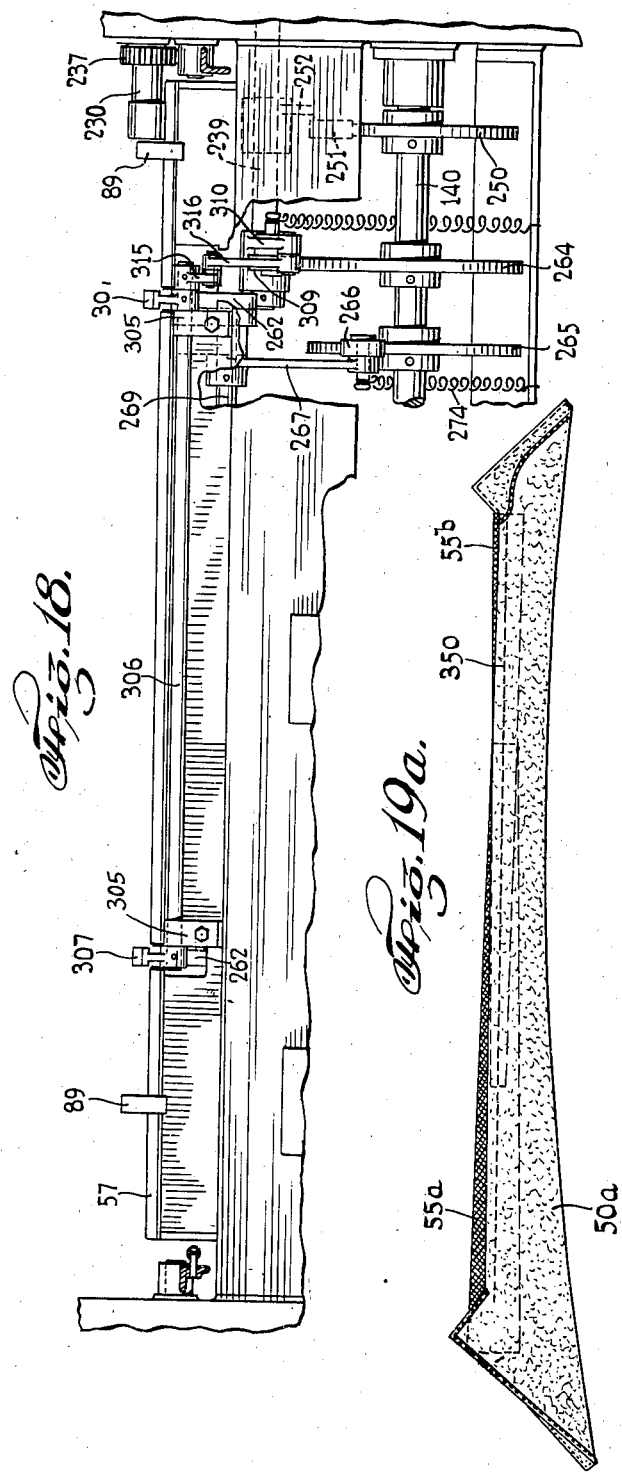
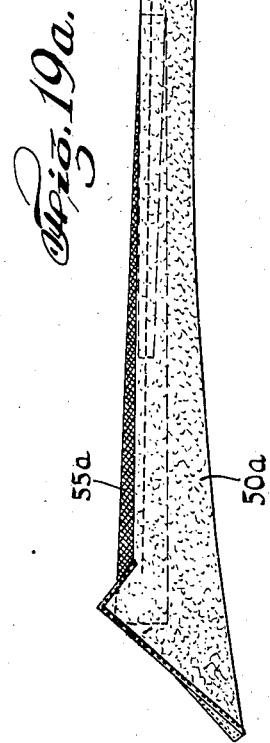
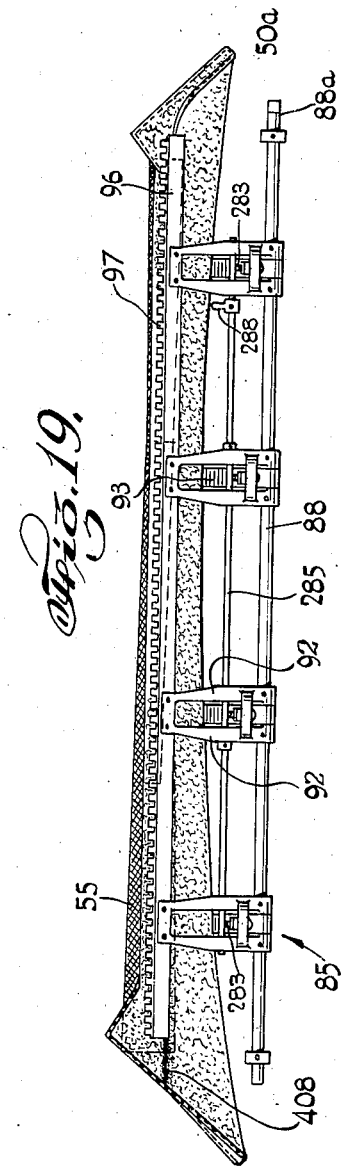
INVENTOR
JAMES J. McGINLEY
BY
ATTORNEY

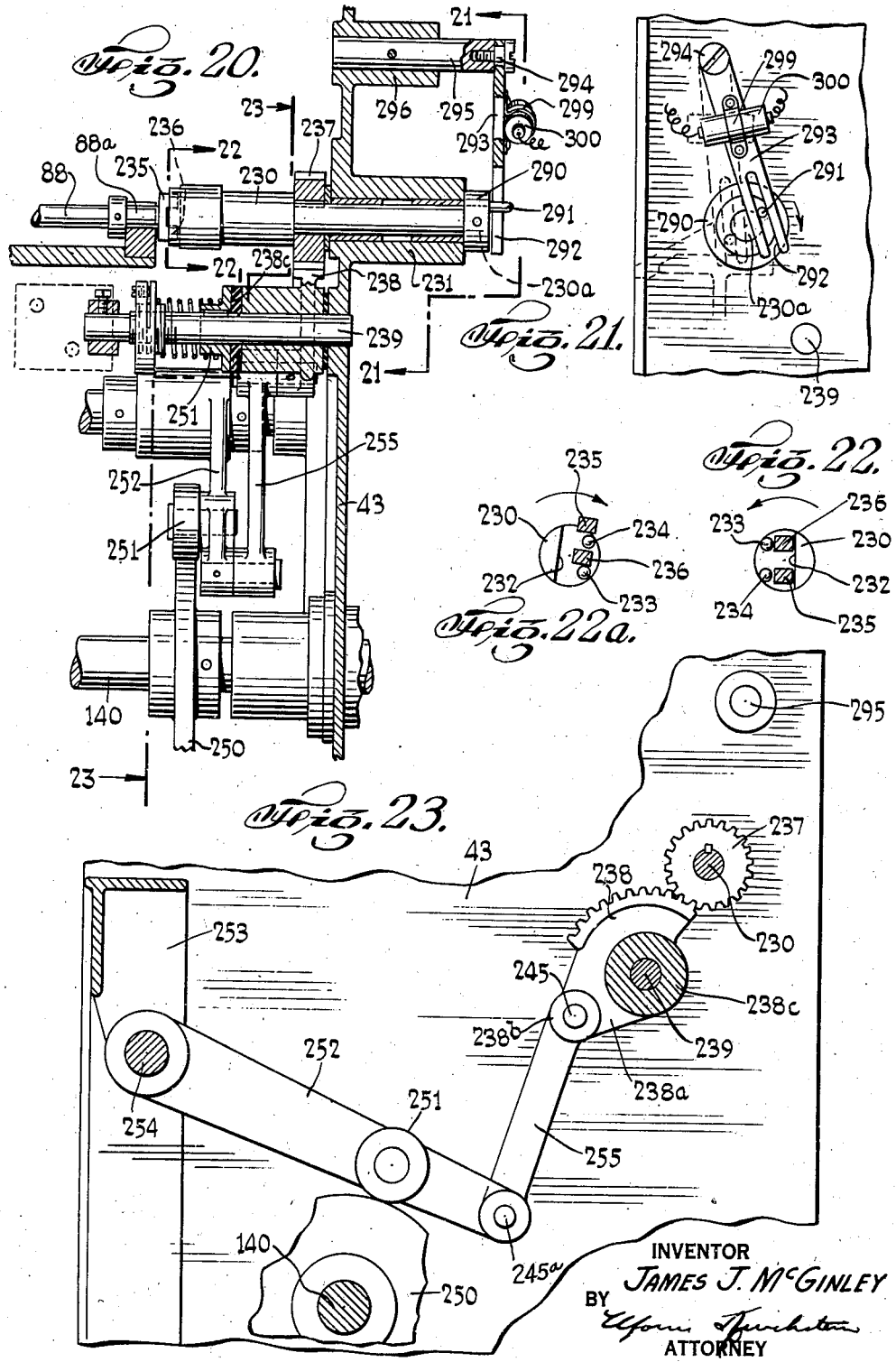

Nov. 24, 1942. J. J. McGINLEY 2,303,057
METHOD AND MEANS FOR MAKING NECKTIES
Filed Dec. 13, 1939 15 Sheets-Sheet 13
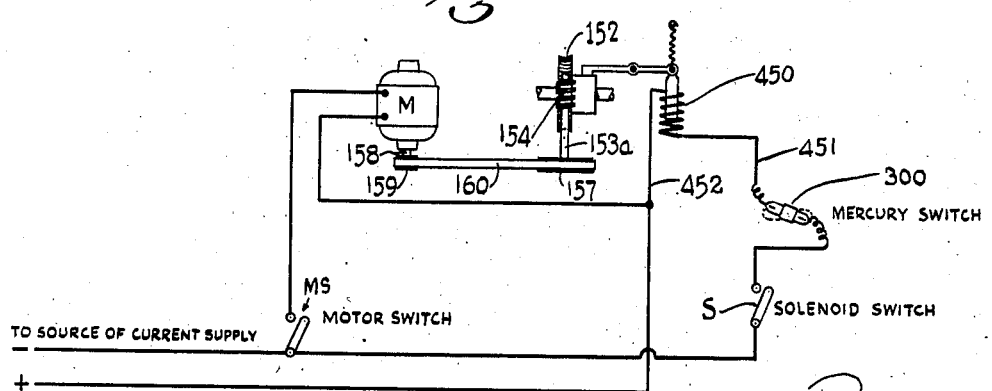
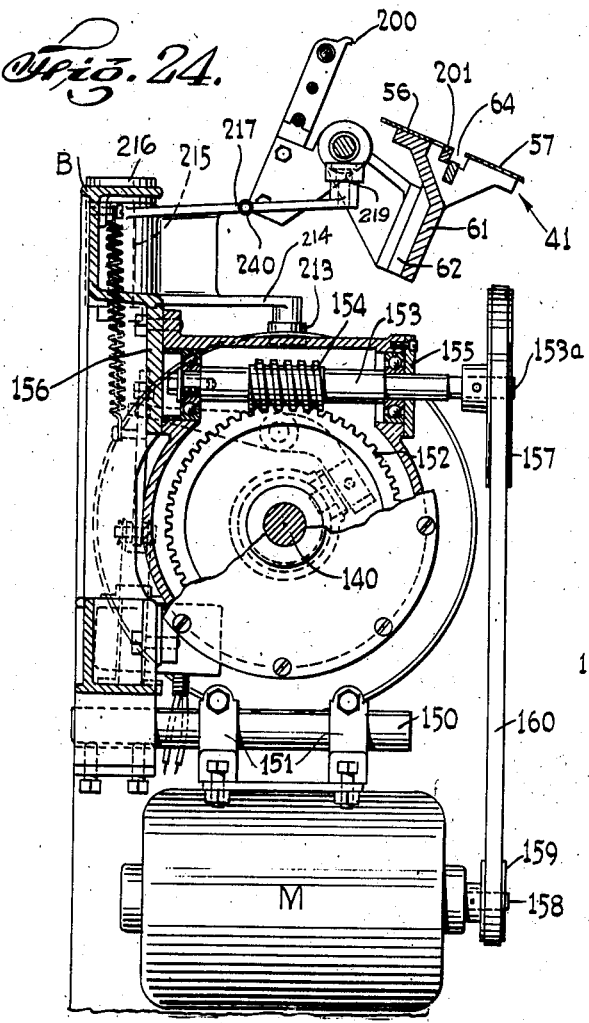
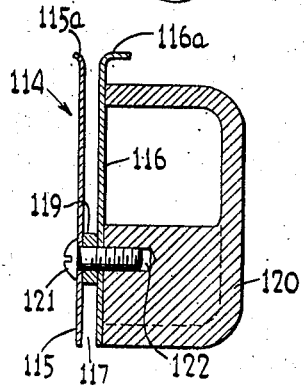
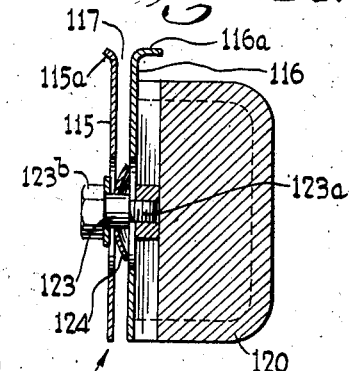
INVENTOR
JAMES J. McGINLEY
BY
ATTORNEY

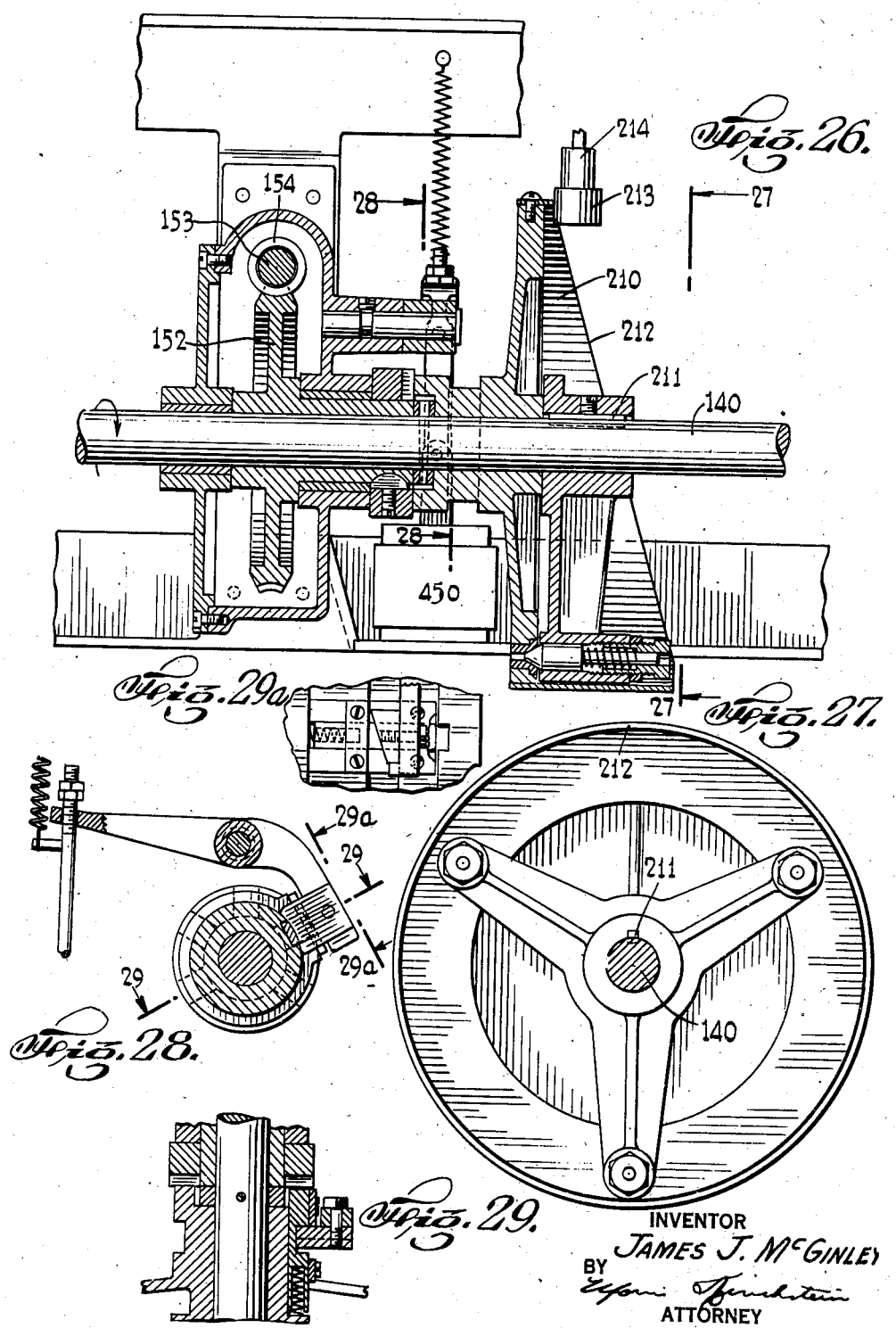

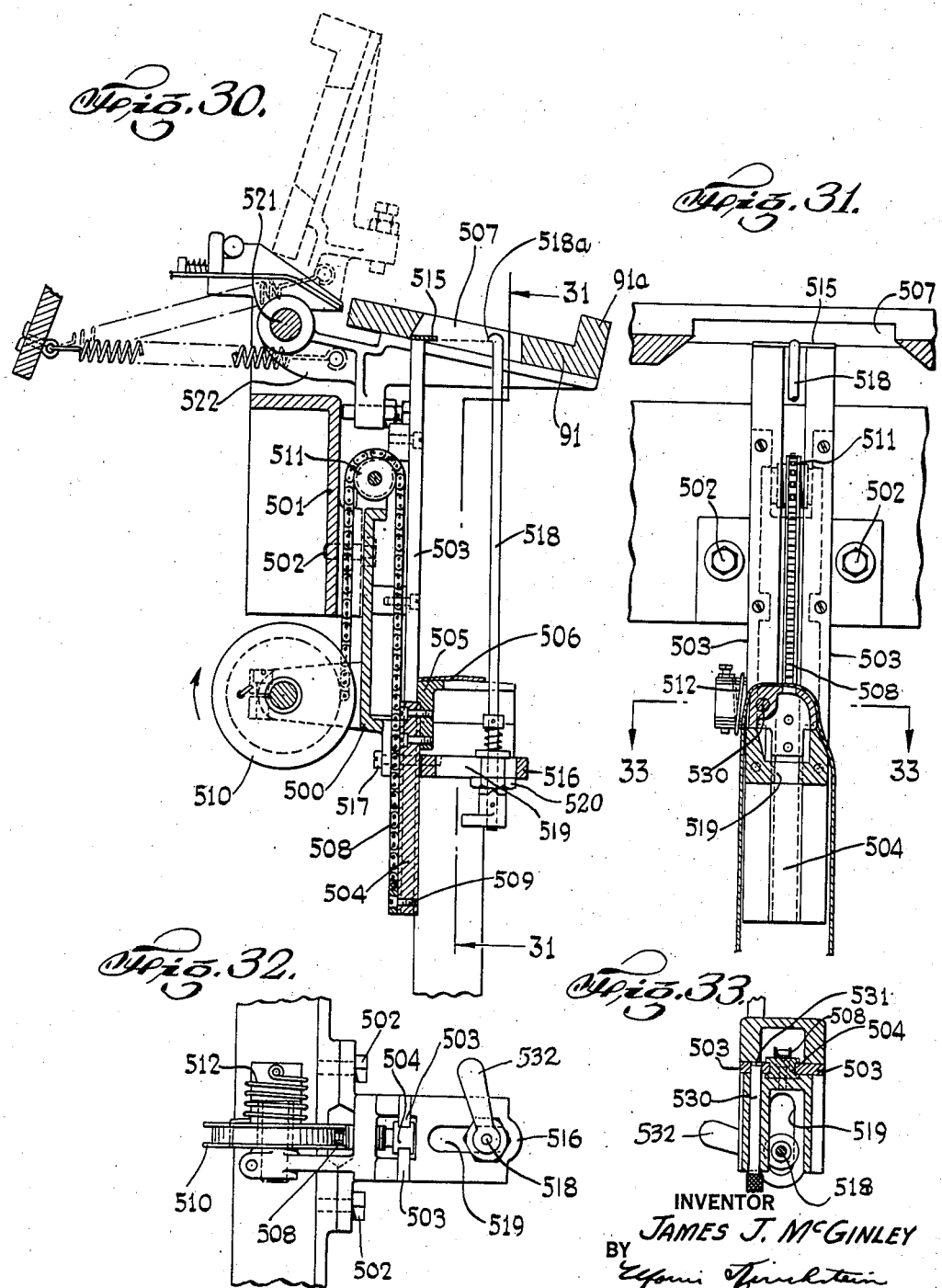

Patented Nov. 24, 1942

2,303,057

UNITED STATES PATENT OFFICE 2,303,057

METHOD AND MEANS FOR MAKING NECKTIES

James J. McGinley, East Williston, N. Y., assignor to American Machine & Foundry Company, New York, N. Y., a corporation of New Jersey Application December 13, 1939, Serial No. 308,935

24 Claims. (Cl. 223—37)

This invention relates generally to neckties. More particularly, this invention relates to an improved method and means for automatically assembling necktie fabrics preparatory to stitching.

One of the objects of this invention is to provide an apparatus of the character described, which shall have automatically actuated means whereby to arrange a necktie fabric and a lining in relatively superimposed relationship and with respect to a predetermined line of stitching with a minimum of handling.

Another object of this invention is to provide in an apparatus of the character described, novel means for automatically folding a necktie fabric longitudinally and stretching the same in a longitudinal direction after the fabric has been folded and before stitching, to simulate the action of the making of so-called hand-made ties.

A still further object of my invention is to provide in an apparatus of the character described, automatic means for locking the assembled and properly positioned necktie fabric and lining on a stitching frame.

Still another object of this invention is to provide in an apparatus of the character described, improved automatically actuated folding means for folding a necktie fabric along a predetermined longitudinal fold line.

Another object of this invention is to provide in an apparatus of the character described, novel automatically actuated means for providing fullness to the large end of the finished necktie.

A still further object of this invention is to provide in an apparatus of the character described, means for automatically ejecting the stitching frame from its support after it has clamped the relatively superimposed necktie fabric and lining in proper relationship with respect to a predetermined line of stitching.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention, Fig. 1 is a front elevational view of an apparatus designed to automatically assemble a necktie fabric and a lining preparatory to stitching, in accordance with this invention;

Fig. 2 is an enlarged plan view of a portion of the apparatus shown in Fig. 1 and illustrating a tie fabric templet with the tie fabric properly positioned therein;

Fig. 3 is a transverse vertical cross-sectional view taken substantially on the line 3—3 of Fig. 2;

Fig. 4 is a horizontal cross-sectional view taken substantially on the line 4—4 of Fig. 3;

Fig. 4a is a fragmentary view of the apparatus shown in Fig. 4, but illustrating the operation of the folding blade;

Fig. 5 is an enlarged transverse cross-sectional view taken substantially on the line 5—5 of Fig. 4;

Fig. 5a is an enlarged sectional detail view of a portion of the apparatus illustrated in Fig. 5, taken substantially on the line 5a—5a of Fig. 5;

Fig. 6 is a horizontal cross-sectional view taken substantially on the line 6—6 of Fig. 3 and showing the lining station;

Fig. 7 is a view similar to Fig. 6, but showing another stage in the automatic operation of the apparatus;

Fig. 7a is a view similar to Fig. 7, but illustrating still another step in the operation of the apparatus;

Fig. 8 is an enlarged fragmentary view of a portion of the apparatus shown in Fig. 3 and illustrating the means for transferring the folded tie fabric to its superimposed position on the lining;

Fig. 9 is a view similar to Fig. 8, but illustrating a further step in the operation thereof;

Fig. 10 is an enlarged fragmentary view of a portion of the apparatus shown in Fig. 3, but showing the stitching frame in one stage of actuation;

Fig. 11 is an enlarged detail view of a portion of the apparatus shown in Fig. 10;

Figure 1:
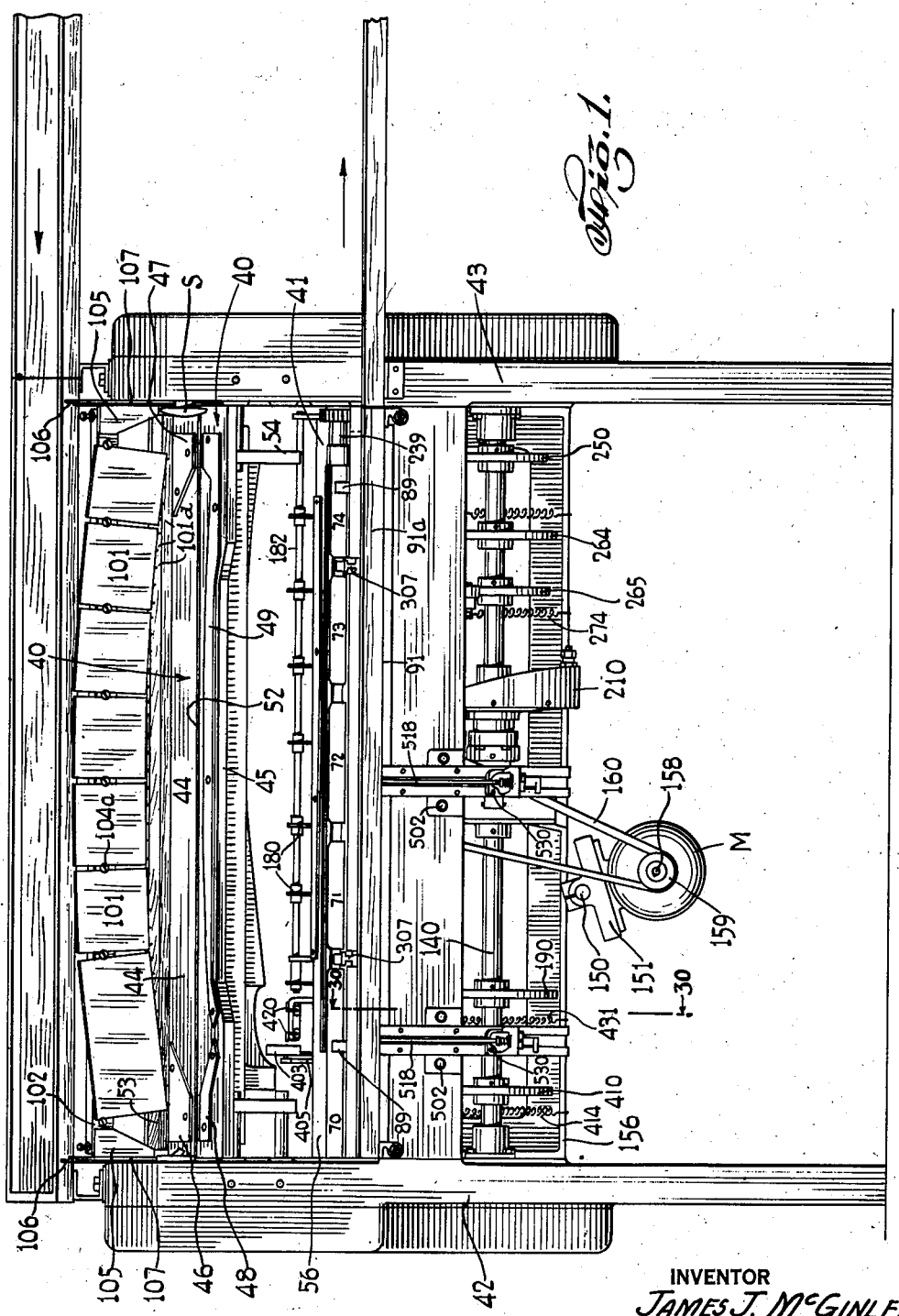

Figs. 12, 13, 14 and 14a are enlarged detail sectional views taken substantially on the lines 12—12, 13—13, 14—14 and 14a—14a respectively, of Fig. 7 and showing the construction and operation of the automatic fabric stretching means;

Fig. 15 is a sectional detail view similar to Fig. 10, but illustrating the final step of automatically ejecting the stitching frame;

Fig. 16 is an enlarged transverse sectional view of the stitching frame illustrated in Fig. 15, but showing the construction and operation of the locking means employed to prevent accidental opening of the jaws of the stitching frame after the necktie fabrics have been gripped therebetween;

Fig. 17 is a fragmentary view of a portion of the device shown in Fig. 16, but illustrating a further step in the operation of the locking mechanism;

Fig. 18 is a front elevational view of a portion of the stitching frame actuating mechanism shown in Fig. 15;

Fig. 19 is a top plan view, but in reduced size, of the stitching frame as shown in Fig. 16;

Fig. 19a is a view of the necktie fabric and lining shown in Fig. 19 after the same has been stitched on the sewing machine and removed from the stitching frame;

Fig. 20 is an enlarged sectional view of a portion of the apparatus shown in Fig. 18 and illustrating the means employed for causing the movement of the stitching frame to open and closed positions;

Fig. 21 is a front elevational view of a portion of the apparatus shown in Fig. 20 and as viewed substantially along the line 21—21 of Fig. 20;

Fig. 22 is a cross-sectional view taken substantially on the line 22—22 of Fig. 20;

Fig. 22a is a view similar to Fig. 22, but illustrating another operative position for a portion of the apparatus;

Fig. 23 is a cross-sectional view taken substantially on the line 23—23 of Fig. 20;

Fig. 24 is a vertical sectional view of a portion of the apparatus shown in Fig. 3, but disclosing the driving and clutching mechanism therefor;

Figs. 24a and 24b are enlarged sectional details of the tie receiving pockets shown in Figs. 3 and 8;

Fig. 25 is a wiring diagram illustrating the method of operation of the apparatus;

Fig. 26 is an enlarged sectional view of a portion of the apparatus shown in Fig. 4 and illustrating the construction and operation of a part of the driving mechanism for the apparatus of our invention;

Fig. 27 is a cross-sectional view taken substantially on the line 27—27 of Fig. 26;

Fig. 28 is a cross-sectional view taken substantially on the line 28—28 of Fig. 26;

Fig. 29 is a cross-sectional view taken substantially on the line 29—29 of Fig. 28;

Fig. 29a is a cross-sectional view taken substantially on the line 29a—29a of Fig. 28;

Fig. 30 is an enlarged cross-sectional view taken substantially on the line 30—30 of Fig. 1;

Fig. 31 is a cross-sectional view taken on the line 31—31 of Fig. 30;

Fig. 32 is a bottom plan view of the apparatus shown in Fig. 30; and

Fig. 33 is a cross-sectional view taken substantially on the line 33—33 of Fig. 31.

The manufacture of neckties is an old art and a highly specialized one, and has progressed from the hand-made stage to the present large scale production, mainly by the development and perfection of mechanical tie stitching means. The materials employed in the making of neckties of the four-in-hand type generally consist of a tie fabric cut to a predetermined shape, which is formed into a tubular casing by stitching, and a lining member which is disposed within the fabric casing and connected thereto by the said stitching. The stitching is generally accomplished with the wrong side of the fabric outermost, and by means of a suitably designed tie stitching machine, such as for example the type disclosed in the Patent to Naftali et al., No. 1,931,447, issued October 17, 1933. After the stitching operation is completed, the sewed together tie fabric layers and lining are reversed and the necktie completed by pressing.

Before joining the necktie fabric and lining by a row of stitching, it is first necessary to arrange the said fabric and lining in a predetermined superimposed relationship to each other and to the ultimate line of stitching, so that, upon reversal, the lining will be properly positioned within the tubular fabric casing.

In order to provide a four-in-hand necktie which will be resilient, so that when made up into a knot it will stretch longitudinally and upon untying will be restored to its original shape, the necktie fabric, as well as the lining, is preferably cut on the bias. It has been found that difficulty was heretofore experienced with the handling of these bias cut fabrics and linings, due to the ease with which they stretch out of normal shape. The disadvantage in the method and means heretofore employed for preparing the tie fabric and lining for stitching was found in the fact that misshapen finished neckties resulted, due to the unavoidable distortion of the bias cut fabrics during the handling of such fabrics while performing the necessary preliminary arranging steps, such as for example the folding and relative positioning of the fabrics.

In accordance with the present invention, novel method and means are provided to overcome the above described disadvantages resulting from the handling of the fabrics and linings preparatory to stitching. Means are provided whereby the amount of handling necessary for properly positioning the fabric and lining with respect to each other and to a predetermined line of stitching is minimized, and which at the same time will result in greatly speeding up the production of neckties. Also, by the present invention it is assured that all ties manufactured according to a predetermined pattern will conform to such pattern and will at the same time be uniform in construction and appearance.

The present invention generally contemplates a method and apparatus for making neckties in accordance with the following procedure.

A necktie fabric which has first been cut to a desired peripheral shape is first positioned in a templet shaped to conform to the previously cut-to-pattern tie fabric. A lining having similarly been cut to a desired pattern is then placed in a second templet. The tie fabric is then automatically folded longitudinally and automatically superimposed in such folded condition on the lining in a definitely gauged position with respect to an ultimate line of stitching. The relatively superimposed fabric and lining are then automatically mounted and maintained in such assembled relationship on a stitching frame, after which the stitching frame is automatically ejected from the apparatus for subsequent mounting on a suitable stitching machine, or for otherwise stitching the same. Means are also provided whereby the folded necktie is automatically stretched longitudinally before being clamped by the jaws of the stitching frame, to produce loose stitching.

Referring now in detail to the drawings, there is disclosed an apparatus constructed in accordance with this invention and comprising an upper flat longitudinal table member 40 and a lower flat longitudinal table member 41, the said table members being substantially horizontally disposed and suitably supported in fixed stationary position at opposite ends thereof by a pair of vertically disposed side brackets 42 and 43.

The upper table member 40 (see Fig. 2) is designed to support a previously cut-to-pattern necktie fabric 50 in flat, unfolded condition and comprises the two parts 44 and 45 separated by a longitudinal slot 52. On the upper surfaces of the table parts 44 and 45 there are mounted raised templet members 46, 47, 48 and 49, shaped to conform to the peripheral contour of the cut-to-pattern necktie fabric 50 and adapted to have the said fabric 50 positioned therebetween with respect to a predetermined longitudinal fold line which coincides with the slot 52. The templet members 46, 47, 48 and 49 may be removably fastened to the table parts 44 and 45 by any suitable fastening means, such as the screws 51. The table part 44 which is fixedly attached at opposite ends thereof to the brackets 42 and 43 may have its rear longitudinal edge 44a folded over and disposed in abutting relationship with respect to a tie fabric stoppage platform 53 (Figs. 2 and 3) also supported between the brackets 42 and 43.

The lower table member 41 (see Figs. 3 and 6) is designed to support a previously cut-to-pattern tie lining 55 and comprises two parts 56 and 57 having their inner longitudinal edges contiguously disposed and being suitably supported at their opposite ends by the brackets 42 and 43. On the upper surfaces of the lower table parts 56 and 57 there are provided raised templet or gauge members 58 and 59 shaped to conform to the peripheral contour of the cut-to-pattern tie lining 55. The said lining 55 may be made of a single piece of material or of two slightly overlapping pieces 55a and 55b, as shown in Fig. 6, and which lining is adapted to be positioned between the templets 58 and 59 with respect to an ultimate line of stitching. The said templets 58 and 59 may be suitably removably fastened to the lower table parts 56 and 57 by the screws 60.

It is noted that the surfaces of the upper tie fabric table member 40 and of the lower lining table member 41 are tilted slightly about their horizontal axes, as shown in Figs. 1 and 3, to facilitate the work of the operator when manually positioning the tie fabric 50 and the lining 55 between the templets, and so that the automatic action and operation of the mechanism hereinafter to be described may be seen by the operator. The parts 56 and 57 of the lower table member 41 are further reinforced and supported by a longitudinal centrally disposed rib casting 61, substantially Y-shaped in cross-sectional contour, which in turn is fixedly mounted adjacent the ends thereof on suitable brackets 62 fixed to the side supports 42 and 43 by any suitable fastening means, such as for example the screws 63. A longitudinal slotted opening 64 is provided between the table parts 56 and 57, the said slot 64 being slightly longer than the length of the lining 55 and interposed between the gauge members 58 and 59. If desired, instead of the gauge members 59 being extended throughout the length of the lining on the longitudinal side opposite to that of the gauge member 58, the table part 57 may be constructed of a series of plates 70, 71, 72, 73 and 74 spaced from each other a predetermined distance by the spaces 75, to permit the positioning and removal in such spaces of the arms of the lower jaw of a stitching frame clamp soon to be described. On the plates 70 to 74 there are mounted gauge pins 76 (see Fig. 8), each of which is fixedly attached to one end of a spring member 77. The opposite end of the said spring 77 is fixedly attached to the under surface of one of the said plates 70 to 74 by a rivet 77a, so that the pins 76 will normally freely project through slots 78 in the said plates 70 to 74 and will yieldingly disappear when the upper jaw member of the said stitching frame clamp is placed thereover. The gauge pins 76 are arranged in conformity with the contour of the adjacent longitudinal edge of the lining 55. The plates 70 to 74 are adjustable by means of large headed screws 79 operating in slots 80 (see Fig. 6), so that the plates 70 to 74 carrying the pins 76 may be adjustably moved to conform to a different width lining or to a lining of different peripheral contour.

Before positioning the lining 55 between the gauges 58, 59 and pins 76, a stitching frame clamp 85 (see Figs. 6, 7, 8 and 11, 16, 19) now to be described is first properly positioned. The stitching frame clamp 85 is designed to grip and hold the properly positioned lining 55 and superimposed folded fabric during the stitching operation and substantially throughout the length of the line to be stitched, to prevent distortion during stitching. The said stitching clamp comprises a pair of cooperating clamping jaw members 86 and 87, pivotally mounted on a single shaft member 88, by means of the arms 93 and 92 respectively. The shaft member 88 is adapted to be removably mounted adjacent opposite ends thereof on a pair of open brackets 89 (see Fig. 7) fixed to a table portion 90 of the apparatus. The said table portion 90 is arranged with the inner longitudinal edge thereof disposed adjacent the outer longitudinal edge of the table part 41 and with the outer or opposite longitudinal edge thereof adjacent a front lower level table member 91 designed to receive the ultimately ejected clamp 85, in a manner to be described hereinafter.

The lower jaw member 86 comprises a longitudinal narrow rod member 94 provided with a plurality of upwardly projecting pins 95 spaced along the length thereof, while the cooperating upper jaw member 87 comprises an elongated flat rod 96 having teeth 97 in the outer longitudinal edge thereof. The said rod members 94 and 96 are designed so that when the jaw members 86 and 87 are closed, they will clamp between them the folded tie fabric and lining, as hereinbefore explained, the prongs or pins 95 serving to prevent relative slipping and displacement of the fabric and lining while clamped by the frame 85. The surface of the rod member 96 disposed adjacent the rod 94 may be provided with detents 95a to protectively receive the points of the prongs 95 therein (see Fig. 11). The teeth 97 are designed to transversely cross the predetermined line of stitching during such stitching operation, so as to produce loose stitching, in the manner fully described in assignee's copending application, Serial No. 9,398, filed March 5, 1935, by Naftali, et al., for Method of and machines for making neckties or similar articles.

When the opposite ends of the shaft 88 are placed in the open brackets 89 to be held in such position, the jaws 86 and 87 are opened up and the rod member 94 positioned within the longitudinal slot 64 (see Fig. 6), with the pins 95 projecting upwardly, while the toothed rod 96 is fully opened up so as to rest on the table portion 91. It is noted that the arms 93 interconnecting the rod 94 with the shaft 88 are disposed in the spaces 75 between the plates 70 to 74.

After the cut-to-pattern tie fabric 50 has been positioned on the upper table member 40 between the gaugers or templets 46 to 49, as above described, with the right side of said fabric uppermost, means are provided, in accordance with this invention, whereby upon the closing of an electric switch the unfolded tie fabric 50 will be automatically longitudinally folded, substantially on its longitudinal axis, to provide a single folded longitudinal edge and a pair of free longitudinal edges. The folding is so accomplished that the fabric, after being folded, will have the wrong side outermost. The folded fabric is at the same time delivered to a pivotally mounted pocket member or fabric carrier disposed in substantially vertical position, after which the pocket member is caused to be moved or swung around to a substantially horizontal position to superimpose the said folded fabric on the lining 55 previously positioned between the templets 58 and 59 on the lower table member 41 in a definite position with respect to an ultimate line of stitching, as above described. The said predetermined position of the necktie materials is such that, when the sewed together necktie fabric and lining are turned inside out or reversed to dispose the right side of the fabric outermost, the lining will be properly disposed within the tubular tie fabric casing.

The mechanism designed for automatically longitudinally folding the necktie fabric 50 and causing the folded tie fabric to be received in the pocket member will now be described.

As shown in Figs. 1, 3 and 4 of the drawings, a folding blade 100 is provided, which is made up of a series of flat relatively thin rectangular shaped members 101, having adjacently disposed transverse edges 101a and 101b slightly spaced from each other. The members 101 are preferably made of rigid material, such as for example any suitable metallic material, and are mounted on a longitudinal rigid supporting bar 102 in any suitable manner, so as to permit of angular adjustment of the members 101, in order that the contiguously disposed bottom edges 101c of the said members 101 shall be formed into any desired contour, such as for example the arcuate shape shown in Figs. 1, 4 and 4a. One such form of attachment is shown in the drawings, and comprises slotted openings 103 in the bar 102 disposed in the spaces between the members 101. Into these openings 103 are fitted screw threaded members 104 provided with enlarged heads 104a. The enlarged heads 104a are designed to overlap portions of the members 101 adjacent the edges 101a and 101b. Wing nuts 104b (see Fig. 3) may be employed to maintain the members 104 in position, to thus maintain the blade members 101 fixed to the bar 102.

It is thus seen from the above described construction that when it is desired to move one of the members 101 either downwardly or upwardly or in an angular direction, it is merely necessary to unscrew or loosen the members 104 and adjustably move the members 101. After such movement of the blade members 101 to desired adjusted position, the screw threaded members 104 may again be tightened.

The bar 102 is provided at opposite ends thereof with a pair of depending bracket members 105 (see Figs. 1 and 4) fixed to said bar 102 for movement therewith by any suitable attaching means, such as for example by welding. The bracket members 105 are designed to freely slidably move in substantially vertically disposed guideways formed by the angle members 106 and 107 (see Fig. 3), each having one leg thereof 106a and 107a respectively rigidly fixed to the inner surface of the main side support 43 by any suitable means, such as for example the screws 108, and having their free legs 106b and 107b respectively in parallel spaced relationship to receive the brackets 105 freely therein. Similar angle members 106 and 107 are also attached to the opposite main side support 42, to permit free sliding movement of the bracket 105 disposed adjacent thereto.

As shown in Fig. 4, the folding blade 100 is normally held in its uppermost, ineffective full line position by abutment members 109 disposed within the guideway formed between the angle members 106 and 107 and in the path of downward movement of the brackets 105. The said brackets 105 may be provided with notched shoulders designed to contactively rest upon the abutment members 109. Each abutment member 109 forms part of a traveling carrier 110 and is interconnected thereto by a rigid link 111. The carrier member 110 is provided with a pair of rollers 112, which are designed to ride between a pair of confining tracks 113, fixed to the supports 42 and 43.

It is thus seen from the foregoing description that when the carrier members 110 ride downwardly in their tracks 113, the abutment members 109 will be carried along with the said carrier members, with the result that the brackets 105, together with the rod 102 and the entire folding blade 100, will fall or move downwardly due to the force of gravity to the dotted line positions, to effectively accomplish the task of longitudinally folding the unfolded tie fabric 50 positioned between the raised templets 46 to 49. It is noted that in the downward travel of the folding blade 100, a portion thereof passes through the slot 52.

By permitting the folding blade to fall by its own weight to accomplish the folding operation as just described, the operation of the machine is thus safeguarded against harm. Should the switch which closes the circuit to cause the automatic operation of the machine be accidentally thrown while the operator's hands or arms are underneath the members 101, such as for example while fitting the tie fabric into the tie templet on the upper level table 40, there will be no force other than that of gravity acting on the folding blade.

In Figs. 2 and 3 the necktie fabric 50 is shown positioned between the templets 46 to 49 in unfolded condition and with the right side of the material uppermost. It is noted that the tie fabric 50 is disposed substantially in a horizontal plane. In Figs. 3 and 4 the folding blade 100 is shown in full lines in its uppermost position. In Fig. 4a the folding blade 100 is shown in a subsequent position after it has been permitted to move downwardly. The members 101 of the folding blade are so aligned with respect to the longitudinal slot 52 in the upper table 40, and are of such thickness, that a portion thereof will readily pass through the said slot 52 carrying the fabric 50 with it, to thereby fold the said fabric 50 substantially longitudinally in half. In Figs. 3 and 4 the tie fabric 50 is shown as completely folded by the dotted lines 50a. It is noted that in this latter position the folded tie fabric 50a is substantially vertically disposed.

To prevent the slipping of the necktie fabric 50 during the above described folding operation, the bottom edges 101c of the members 101 of the folding blade 100 are provided with a plurality of downwardly projecting pins 101d designed to non-destructively pierce or grip the fabric 50 when it is being pulled through the slot 52.

The following means are provided for causing the folded tie fabric 50a to be received and retained in such folded condition while it is being transferred to superimposed position on the properly positioned lining 55 at the lower table level 41.

Referring now particularly to Figs. 1, 3, 4, 24a and 24b, there is shown a fabric carrier or pocket member 114 adapted to receive the folded fabric 55a therein and comprising a pair of flat longitudinal wall members 115 and 116 disposed in spaced parallel relationship to each other. The members 115 and 116 are positioned directly underneath the tie fabric table member 40, and the space 117 between the said members 115 and 116 is designed to be substantially of the same width as that of the space 118 between the angle members 106 and 107 and in alignment therewith and with the longitudinal slot 52 (see Fig. 3). At the receiving end of the space 117 the edge portions 115a and 116a of the members 115 and 116 respectively are outwardly flared or rounded, as shown, to prevent damage to the folded tie fabric as it moves into the said space 117.

The members 115 and 116 are maintained in spaced relationship by the spacer members 119 disposed along the length thereof, and are fixedly supported on a longitudinal channel shaped support 120 by means of the screws 121 passing through the members 115 and 116, through said spacer members 119, and threadedly received in the threaded openings 122 of the support 120.

As shown in Fig. 24b of the drawings, the following means are provided for releasably retaining the folded fabric 50a in the pocket 114 and during the time that the said pocket member travels to its lower level position to superimpose the folded tie fabric 50a on the previously positioned lining 55.

At spaced points along the length of the pocket 114 there are provided the screw members 123, each having one threaded end 123a thereof received in the support 120 and an enlarged head 123b abutting the outer surface of the member 115. A bowed spring 124 surrounding the members 123 is disposed in the space 117 between the members 115 and 116, to resiliently alter the width of the space 117 at selected points, to frictionally and resiliently retain the folded longitudinal edge of the folded fabric 55a within the space 117.

As clearly shown in Figs. 4 and 4a of the drawings, the distance of downward travel of the folding blade 100 is limited by a pair of stop members 125 and 126, mounted on the bent over flange of the bar 102 and disposed adjacent opposite ends thereof. Each of the said stop members 125 and 126 comprises an externally threaded rod member 127 passing through a threaded hole in the said bar flange 102 and projecting downwardly a predetermined distance. The members 125 and 126 are spaced laterally away from the longitudinal slot 52 of the table 40, so that when the folding blade is permitted to move downwardly, the bottom ends of the rods 127 will strike the top surface of the table part 50 and thus prevent further downward movement of the folding blade, as shown by dotted lines 127' in Fig. 4. This limit of downward travel of the folding blade 100 is so arranged that the folded longitudinal edge of the tie fabric 50a will be received in the space 117 to a satisfactory depth, to be resiliently held therein. Lock nuts 128 may be provided to maintain the stop members 125 and 126 in proper adjusted position. If desired, the rods 127 may be adjusted to different levels, as shown in the drawings, so that one end of the folding blade 100 may travel further into the space 117 of the fabric carrier 114 than the other, to compensate for those necktie fabrics which are cut on an irregular or unsymmetrical pattern.

The means for automatically causing the carrier members 110 to travel downwardly to permit the folding blade 100 to fall and accomplish its designed folding task, and for automatically restoring the said folding blade to its original position after the folding operation, will now be described.

As shown in Figs. 4 and 5, there is pivotally attached to an extending portion 110a of each carrier 110 a lengthwise adjustable link comprising the parts 130 and 131 interconnected by a threaded nipple member 132. The part 130 is pivotally mounted on the extension 110a and the part 131 is pivotally connected to one end of a link 133 by the pivot 134. The opposite end of the link 133 is pivotally connected to a stationary bracket 135 by the pivot 136, the said bracket 135 being in turn fixed to the main end support 42. It is thus seen from the above description that, when the link 133 is caused to rotate about its pivot 136 in a counterclockwise direction, as shown in Fig. 5, the carrier 110 will be caused to move downwardly and the rollers 112 will ride in the tracks 113, to permit the folding blade 100 to fall by the action of gravity. When the link 133 is rotated in a clockwise direction, the carrier 110 will be moved upwardly to restore the folding blade 100 to its original position.

To properly synchronize the above described downward and upward movement of the folding blade 100 and to render such movement automatic, the following mechanism is provided.

A cam 137 is fixedly mounted on a rotatably mounted cam shaft 140. A cam follower comprising a roller 138 is rotatably mounted on a lever 139. The lever 139 is in turn pivotally supported at one end thereof by a stationary bracket 141, by means of the pivot 142, the said bracket 141 being fixed to the main support 42. The pivot 142 is so positioned with respect to the cam 137 that the roller 138 will rest upon and ride on the rim or edge of the cam 137. The opposite end of the lever 139 from that of the pivot 142 is interconnected to the link 133 by means of a second link 143 having one end thereof pivotally connected to the lever 139 by the pivot 144, and the opposite end of said link 143 pivotally connected to the link 133 by the pivot 145. It is now seen that when the cam shaft 140 is rotated in a clockwise direction, the carrier 110 will be automatically moved due to the action of cams 137, and the interconnecting links 139, 143, 133 and 130 to 132. The said movement of the carrier 110 will be first in a downward direction, to permit the folding blade 100 to fall, and then in an upward direction, to restore the folding blade 100 to its uppermost position. A spring 146, having one end thereof fixed to the lever 139 at 147, the other end of said spring being fixed to the support 42 at the point 148, serves to maintain the roller 138 in constant contact with the rim of the cam 137.

As shown in Figs. 1 and 24, the following means are employed for causing the rotational movement of the main cam shaft 140.

An electric motor M, suitably supported on a bar 150 by the strap supports 151, is connected to a suitable source of current supply. A gear 152 is rotatably mounted on the cam shaft 140 for rotation therewith and drives said shaft through the one-revolution clutch shown in Figs. 26 through 29. A shaft 153 carrying a worm gear 154 in mesh with the gear 152 is journaled in a bracket 155, the said bracket 155 being in turn fixed to the rigid cross member 156 interconnecting the main side supports 42 and 43. An extending portion 153a of the shaft 153 has fixedly mounted thereon a pulley 157. The motor shaft 158 has fixedly mounted thereon a pulley 159, and the pulleys 157 and 159 are interconnected by a belt 160. Thus it is seen from the above description that when the motor M is energized by the closing of a motor switch, the cam shaft 140 will be rotated, due to the pulleys 157, 159 and the gears 152 and 154. It is also noted that when the folding blade 100 has effectively folded the tie fabric 50 longitudinally, substantially in half, and delivered the folded fabric 50a into the receiving pocket 114, the tension means comprising the springs between the pocket members 115 and 116 will hold the folded fabric captive within the said pocket while the folding blade 100 is restored to its original position.

The following means are employed for automatically effecting the next step in the assembling of the necktie materials, i. e. the step of automatically causing the pocket 114 with the folded fabric contained therein to be so moved as to superimpose the said folded fabric on the tie lining 55 at the lower lining table level.

As shown in Figs. 3, 5 and 5a, the pocket member 114 is provided with an extending integral bracket 150 at each end thereof, each of said brackets 150 being fixedly attached to a shaft 151 for rotation therewith. The shaft 151 is journaled in a bracket 152, which is mounted for sliding movement in a vertical direction between a pair of tracks or guide members 153 and 154 fixed to the end support 42 by the screws 157. A slotted opening 155 in the said support 42 (see Fig. 5) permits the said sliding movement of the bracket 152. Fixedly attached to an extending portion 151a of the shaft 151, for rotational movement therewith, is a rocker member 156 having a bearing portion 156a connected to the part 156 by an arm 156b.

In order to properly position the folded necktie fabric from within the carrier 114 to its predetermined place on the lining, the said carrier 114 is first rotated through an angular distance of about 90° by rotating the rocker member 156 in a counter clockwise direction, after which the carrier 114 in such changed angular position is caused to travel downwardly toward the lower level lining table 41. The automatic actuation of the movement of the carrier or pocket 114 is accomplished in the following manner.

Referring in particular to Figs. 3 and 5, a cam 160 is fixedly mounted on the main cam shaft 140. In cooperative relationship with the said cam 160 is a cam follower or roller 161 rotatably mounted on a lever 162, in such manner that the said roller 161 will ride on the rim of the cam 160. The lever 162 is pivotally fixed at one end thereof to the pivot 142. A link 163 interconnects the rocker arm 156 and the lever 162. The said link 163 comprises the members 163a and 163b threadedly interconnected by the rod 163c to render said link adjustable in length. The member 163a is pivotally connected to the lever 162 by the pivot 164, while the member 163b is pivotally connected to the rocker arm 156 by the pivot 165.

It is thus seen from the above described construction that when the cam shaft 140 is rotated in a clockwise direction, the cam 160 will cause the link 163 to move upwardly, to thereby rotate the pocket brackets 150 and pocket 114 in a counterclockwise direction through an arc of substantially 90 degrees. While in such last named position, the pocket 114 is next caused to move downwardly to the dotted line position shown in Fig. 3, by the following mechanism.

A cam 166 is fixed to the main cam shaft 140 for rotation therewith. Arranged for cooperative action with the rim of the said cam 166 is a cam follower or roller 167, rotatably mounted on a lever 168 having one end therewith pivoted at 142. A link 169 interconnects the lever 168 with the shaft portion 151a. The said link 169 comprises the members 169a and 169b threadedly interconnected by the rod 169c to render the link 169 adjustable in length. The member 169a is pivotally attached to the lever 168 at 170, while the member 169b is pivotally mounted on the shaft 151.

It is thus seen from the above described construction that when the cam 166 is rotated, the link 169 will be moved downwardly to carry with it the slidable bracket 152 and the shaft 151 carrying the backet 150 and the pocket 114. The cams 160 and 166 are so designed that, upon continued rotation of the shaft 140, the fabric carrier or pocket 114 will be restored to its original position, as shown in full lines in Fig. 3. The cams 160 and 166 are also designed to work in synchronism, so that the pocket 114 will be first rotated and then in proper timed relationship, lowered to a proper position for superimposing the folded tie fabric on the lining.

A spring 171, having one end connected to the lever 162 and the other end thereof connected to the support 42, serves to maintain the roller 161 in contactive engagement with the rim of the cam 160. Similarly, a spring (not shown) having one end thereof fixed to the lever 168 and the other end thereof fixed to the support 42, may be employed to maintain the roller 167 in contactive engagement with the rim of the cam 166.

As shown in Fig. 3 in dotted lines and in Figs. 8 and 9 in full lines, after the necktie fabric has been folded in the manner hereinbefore described and positioned within the space 117 between the pocket plates 115 and 116, a portion of such folded fabric adjacent the longitudinal edges most remote from the folded edge projects outwardly from the said space 117. The mechanism above described for superimposing the folded fabric on the lining in relation to a predetermined line of stitching is so designed that when the pocket 114 is in the dotted line position shown in Fig. 3, the said projecting longitudinal edges of the folded fabric will rest upon a portion of the lining, as shown in Figs. 8 and 9.

When the folded necktie fabric is in proper overlying position with respect to the lining, as described above, the following means are employed for gripping the material of the fabric and pulling the same out of the pocket against the resilient action of the plates 115 and 116, while the pocket is returned to its original position. The same means are also utilized for progressively stretching the relatively superimposed folded fabric and lining, in a horizontal direction, beginning at one end of the said necktie materials.

Referring now to Figs. 3, 6, 7, 8, 9 and 12 of the drawings, it is seen that the gripping means comprises a plurality of spaced fingers 180, each fixedly mounted on a collar 181, which in turn is slidably mounted on a longitudinal shaft 182 (see Fig. 6). The shaft 182 is fixedly mounted in extensions 183 of the brackets 184 disposed adjacent the ends of the shaft 182 and which brackets 184 are in turn fixedly attached to a shaft 185. The said shaft 185 is journaled in a pair of bearings 186 fixed to a cross bar of the apparatus. At points adjacent the opposite ends of the shaft 185, adjacent the bracket extensions 183, are members 186a (see Fig. 12) fixedly attached to the shaft 185 for rotation therewith and in a definite angular relationship with respect to the bracket extension 183 and the fingers 180. The fingers 180 and collar 181 are held against rotational movement about the shaft 182 by means of a second shaft 187 parallel to and spaced from the shaft 182 and fixedly mounted on the bracket extensions 183 and received within notched or forked ends 188 of the fingers 180 (see Fig. 12).

In Fig. 3 the fingers 180 are shown in full lines in their normal starting position, i. e. the position when the pocket member 114 is shown in position underneath the folding slot 52 of the upper table 40. The fingers 180 are caused to be moved into the effective gripping position illustrated in dotted lines in Fig. 3 and in full lines in Fig. 12 in synchronism with the movement of the pocket member 114 to its dotted line position in Fig. 3 by the following mechanism.

A cam 190 (see Fig. 12) of specifically designed peripheral contour is fixedly mounted on the main cam shaft 140 for rotation therewith. Rotatably mounted on the leg 192 of a bell crank 191 is a cam follower or roller 193 designed to ride upon the rim of the cam 190. The bell crank 191 is mounted on a pivot shaft 194 supported by the bracket 195, which in turn is fixed to the back cross bar of the apparatus (see Fig. 12). The other leg 196 of the bell crank 191 is also provided with a rotatably mounted follower or roller 197, which is designed to freely ride within a slotted guideway 198 in the member 186a.

The roller 193 is shown in Fig. 12 as positioned at the high point of the cam 190, so that in such position the fingers 180 will be in effective gripping position. However, the cam is so designed that, upon continued rotation thereof, lower points will be reached so as to bring the fingers 180 back to their original starting position, as shown in full lines in Fig. 3.

It is thus seen from the above described construction that when the main cam shaft 140 is rotated, the bell crank 191 will be caused to rotate about the pivot 194, to cause the leg 196 to rotatably move the member 186a about its pivot shaft 185, to actuate the gripping fingers 180. Each of the fingers 180 is preferably provided with a narrowed tip portion 199, from which there projects a pin 200. These pins 200 are designed to pierce the two adjacent layers of the folded tie fabric, as well as the lining positioned beneath the said folded fabric layers (see Figs. 8 and 9), and thus hold them in position while the pocket member 114 is automatically restored to its initial or starting position. A longitudinal groove 201 is provided in the surface of the lower table part 56, to protectively receive the point of the pin 200 therein. A spring 202 (Fig. 12), having one end thereof fixed to the apparatus, serves to maintain the roller 193 in constant engagement with the rim of the cam 190, and also maintains the fingers 180 in whatever position they happen to be when rotational movement of the cam 190 is stopped.

In order to increase the looseness of the ultimate stitching when the assembled tie fabric and lining are sewed together and at the same time to straighten out the superimposed layers, i. e. to take up any slackened portions and to keep it taut throughout its length to facilitate sewing, the following mechanism is provided, which is so arranged that it will be automatically rendered effective when the fingers 180 have gripped the materials as above described.

The fingers 180 are provided with aligned apertures 205, through which is freely passed a shaft 206 slidable axially within said apertures 205. Fixedly mounted on the shaft 206 are the abutting members 207, 208, 209, 210, 211 and 212. It is noted (see Fig. 7) that the member 212 is disposed up against the flat side of one finger 180, and that each of the other members 211, 210, 209, 208 and 207 are spaced a progressively greater distance from their adjacent finger gripping members 180. Due to the fact that the fingers 180 are fixed to the collars 181, which are in turn slidable on the shaft 182, it is readily seen that when the shaft 206 is axially moved in a direction toward the right, as viewed from Fig. 7, the member 212 will immediately cause its adjacent finger to move toward the right. After a predetermined distance of such axial sliding movement of the shaft 206, the member 211 will abut and slidably move its adjacent finger 180. After a still further distance of travel of the shaft 206, the member 210 will abut and slidably move its adjacent finger 180. The remaining members 209, 208 and 207 will similarly slidably move their adjacent fingers in progressive relationship while the shaft 206 is continued to be slidably moved.

It is thus seen from the above described construction that if, after the finger gripping members 180 have been rotated to effective position as in Figs. 7 and 12, the shaft 206 is then slidably moved to the right, as described, the adjacently disposed folded tie fabric layers and lining, pierced and gripped by the finger pins 200, will be progressively stretched lengthwise beginning from the right hand end of the materials, to the position shown in Fig. 7a.

The following means, timed in proper synchronism with the operation for moving the fingers 180 to effective gripping position, are provided for automatically causing the relatively superimposed necktie fabric 50a and lining 55 to be progressively stretched in a longitudinal direction beginning with one end, in this case the right hand end.

As shown in Figs. 1, 4, 7, 24 and 26 of the drawings, there is mounted on the main cam shaft 140 a cam 210. The said cam 210 is fixed to the shaft 140 for rotation therewith by a key and keyway connector 211, and is at the same time slidable axially on said shaft 140. The cam 210 is provided with an effective cam edge 212 of a predetermined tapered contour, so that rotational movement of said cam 210 will cause lateral movement of a cam follower or roller 213, rotatably mounted on an arm 214, which in turn is pivotally mounted on a vertical pivot shaft 215 journalled in a bracket 216 fixed to the cross bar B of the apparatus (see Fig. 24). Fixed to the vertical pivot shaft 215, for movement therewith, is one end of a second arm 217, the opposite end of said second arm 217 being pivotally attached to a sleeve member 218 by means of the pivot 219 (see Fig. 24). The sleeve 218 is axially slidably mounted on the shaft 185, journaled in the bearings 186, as hereinbefore described.

It is thus seen from the above described construction that when the cam 210 is automatically caused to be clutched into effective operative position with the main cam shaft 140, and rotated with said shaft 140, the roller 213 will cause the arms 214 and 217 to pivotally move about their pivotal shaft 215, to cause axial sliding movement of the sleeve 218 on the shaft 185. This rate and distance of this movement of the sleeve 218 is governed by the design of the cam edge 212.

Fixedly attached to the sleeve 218 for movement therewith is a projecting member 220, the free end portion of which is received between two abutment members 221 and 222 fixed to the shaft 182 (see Fig. 7). Therefore, whenever the sleeve 218 is slidably moved in an axial direction, the projection 220 thereof will cause the shaft 206 to slidably move in the same direction, due to the members 221 and 222, to move the fingers 180 and thus cause stretching of the necktie materials, as described above, a spring 240 (Fig. 7) fixed at one end thereof to the arm 217 and at the other end thereof to a bracket 241 fixed to the cross bar B of the apparatus serves to maintain the sleeve 218, and consequently the shaft 206, in its initial position (shown in Fig. 7) before the stretching operation begins. Fig. 7a illustrates the sleeve 218 moved to its effective position, where maximum stretching has taken place.

After the necktie materials have been stretched and while the fingers 180 are effectively holding the said materials in such stretched condition, the following means are provided for automatically causing the upper jaw 96 of the clamp device of the stitching frame 85 to move from its open position, as shown in Fig. 6, into operative clamping position with respect to the lower clamp jaw 94, as shown in Figs. 16 and 19.

Referring particularly to Figs. 6, 16, 18, and 20 to 23 of the drawings, there is shown a shaft 230 journaled in a bearing 231 forming an integral part of the main end support 43 (see Fig. 20). The apparatus shown in Fig. 22 illustrates the stitching frame clamp in its open position, corresponding to Fig. 6. One end of the shaft 230 is provided with a notched portion forming a wall 232 (see Figs. 22 and 22a). In the notched area there is provided a pair of projecting pins 233 and 234 spaced from each other and from the wall 232. Into said notched shaft area and between the wall 232 and the pins 233 and 234 is received one end 88a of the rod 88 of the stitching frame 85, the said end 88a being enlarged and forked to provide two prongs 235 and 236. At the proper synchronized time, the said shaft 230 is caused to rotate in a clockwise direction, in a manner soon to be described, to cause rotational movement of the clamp rod 88 by means of the interlocking clutching arrangement of the fork prongs 235, 236 and the pins 233, 234 and wall 232. The rotational movement of the rod 88 will cause the clamp jaw 96 attached thereto by the arms 93 to move to closed position, where it overlies the cooperating jaw 94, to clamp the assembled, stretched fabrics between them, as shown in Fig. 16. The means for automatically causing clockwise rotation of the rod 88 will now be described.

Mounted on the shaft 230 for rotation therewith is a gear 237 adapted to mesh with the teeth of a gear segment 238 rotatably mounted on a stationary shaft 239, the said shaft 239 being supported by the bracket 42. Integral with the gear segment 238 is an arm portion 238a having a bearing portion 238b for a pivot member 245. From the above description it is apparent that when the gear segment is caused to move in a clockwise direction with respect to Fig. 23, the gear 237 will be caused to move in a counterclockwise direction, to cause rotational movement of the shaft 230. To automatically provide synchronous actuation of the said shaft 230, there is provided a cam 250 mounted on the main cam shaft 140 for rotation therewith. Adapted to ride on the edge of the cam 250 is a cam follower or roller 251 rotatably mounted on a lever 252 pivotally mounted at one end thereof on a bracket 253 by means of the pivot 254. The bracket 253 is fixed to the support 43. Pivotally interconnecting the gear segment 238 with the lever 252 by means of the pivots 245 and 245a is a link 255 to cause actuation of the gear 237 and shaft 230, in accordance with the peripheral contour of the cam 250.

It is noted in Fig. 20 that the gear segment 238 is provided with a spring pressed friction plate member 251 mounted on the shaft 239, which normally frictionally bears up against a flat side 238c of the gear segment 238. This is done so that the shaft 230 may be rotated independently of the cam 250, in order to properly position the pins 233 and 234 with respect to the projections 235 and 236 on the rod 88.

Simultaneously and in synchronism with the automatic movement of the clamp jaw 96 to closed position in a direction toward the clamp jaw 94, the following mechanism is employed for automatically urging the relatively stationary lower clamp jaw 94 toward the moving clamp jaw 96. This insures a better gripping action between the said jaws, by causing the pins 95, which have hitherto been positioned out of the way of the necktie materials during the stretching operation, to pierce the stretched materials to hold them in such stretched condition during the ultimate sewing operation.

Referring now to Figs. 3, 4, 6 and 8 to 11, there is shown a longitudinal bar 260 horizontally disposed in the slotted recess 64 of the lining table and arranged for vertical movement between a series of guides 261 (see Fig. 4) and a portion of the wall of the member 61. The bar 260 is supported by a plurality of spaced movable arm members 262. It is noted (see Fig. 10) that the bottom longitudinal edge of the bar 260 rests upon the protruding lips 262a of the arms 262. The bar 260 may be fixed to the arms 262 by the screws 263 (see Fig. 4), so that, upon upward or downward movement of the said arms 262, the bar 260 will also move in the same direction. The mechanism for causing the movement of the bar 260 is so timed that the said bar 260 will be moved upwardly to urge the lower clamp jaw 94 in a direction toward the clamp jaw 96. It is thus seen that the clamp jaws 94 and 96 will be urged in opposite directions towards each other to firmly grip the assembled necktie materials between them. The automatic movement of the arms 262 is effected as follows:

Mounted on the main cam shaft 140 is a cam 264 (see Fig. 10) having a suitably designed cam edge 265. A cam follower or roller 266, rotatably mounted on a lever 267 by the pivot 268, is adapted to ride on the cam edge 265. The lever 267 is in turn fixedly mounted on the shaft 269, the said shaft being journaled in the bearing 270 (see Fig. 4). Also fixedly attached to the shaft 269 for rotation therewith are a plurality of spaced links 271. Each of said links 271 is disposed adjacent an arm 262 and each link 271 is interconnected with its adjacent arm 262 by a pivot 272. In view of the above description, it will be seen that when the main cam shaft 140 is caused to rotate in the direction of the arrow 273, the arms 262 will be caused to move upwardly to cause the bar 260 to move to its effective uppermost position, as shown in Figs. 10 and 11, when the cam 265 reaches a high point. Upon continued rotation of the cam 265 in the same direction, the bar will be restored to its original ineffective position, such position being that shown in Figs. 3, 8, 9 and 15.

A spring 274 having one end fixed to the lever 267 and the opposite end thereof fixed to the framework of the apparatus, serves to maintain the roller 266 in constant engagement with the cam edge 265.

From the description of the apparatus thus far given, it is seen that the relatively superimposed lining 55 and folded fabric 50a, properly positioned with respect to a predetermined line of stitching and longitudinally stretched, have now been tightly gripped between the jaws 94 and 96 of the stitching frame.

To maintain the said jaws 94 and 96 of the stitching frame in such clamped position, the following spring actuated locking device, illustrated in detail in Figs. 6, 16, 17 and 19, is provided. Each of the arms 93 of the lower jaw 94 of the stitching frame 85 is provided with a raised and forwarding projecting lug portion 280. In each lug 280 is an opening 281 freely receiving a pin having an enlarged head 282 captively held within the opening 280 by an apertured bushing member 281a and having a portion 283 thereof extending outwardly therefrom. A spring 284, housed in the opening 281, normally urges the pin portion 283 to its outermost projecting position. Each pair of arms 92 is provided with aligned apertures, through which is passed a rod 285. At predetermined positions between each pair of arms 92, the rod 285 is provided with notches 286 cut into the surface of the said rod 285. The rod 285 is disposed at a predetermined distance from the rod 88, so that upon rotation of the said rod 88 in the manner hereinbefore described, to swing the jaw 96 over into operative clamping position, the spring pressed pins 283 will be resiliently received in the notches 286. It is noted that the free ends of the pins 283 are angularly cut to conform to the notch 286, so that the said pins 283 will snap into the notches 286 and the jaws 94 and 96 will thus be prevented from opening. After the stitching frame has been removed from its mounting, in the manner soon to be described, and the assembled necktie materials sewed together, the frame jaws 94 and 96 may be separated to release the sewed together necktie materials by simply manually rotating the rod 285 until the pins 283 are freed from the notches 286, to permit relative rotational movement of the said jaws 94 and 96. To facilitate the manual rotation of the rod 285, a handle 288 is fixedly mounted on the rod.

In Fig. 16, the handle 288, shown in full lines, represents its position when the jaws 94 and 96 are locked in clamped position. It is noted that in such position it is not possible to rotate the arms 92 in a clockwise direction. However, when the handle 288 is moved to the dotted line position 288′, the pins 283 will be withdrawn from the notches 286 and the arms 92 together with the jaw 96 may then be rotated in a clockwise position to free the clamped necktie materials.

From the description of the automatic operation of the apparatus thus far given, it is obvious that the effective actuation of the clamp jaw 96 in its movement toward the jaw 94 must be so synchronized with respect to the effective actuation of the means for superimposing the folded fabric 50a on the lining 55, that the clamp jaw 96 will move to closed position only after the said folded fabric has been properly superimposed on the lining and the pocket 114 moved out of the path of movement of the clamp jaw 96 to be restored to its normal position; otherwise the mechanisms would jam or smash. To this end, there is employed the following safety means designed to prevent the apparatus from beginning its cycle of operation except when the clamp jaw 96 is in proper position with respect to the other devices described.

Referring now in particular to Figs. 20 to 23 and 25 of the drawings, it is noted that a portion 230a of the shaft 230 projecting outwardly beyond the bracket 231 is provided with a collar 290 fixed to the said shaft 230 for rotation therewith. On the collar 290 is an outwardly projecting pin 291 spaced from the central axis thereof and which is therefore adapted to be the axis of the shaft 230. The pin 291 is received in a notch 292 of a forked lever 293, which in turn is pivotally mounted at one end thereof on a pivot 294 fixed to a stationary shaft 295 supported by the bracket 296. The said bracket 296 may be integral with a wall of the support 43 and spaced above the bracket 231. It is thus seen that when the shaft 230 is rotated, the pin 291 will cause oscillatory movement of the forked lever 293 about the pivot 294.

Mounted on the lever 293 for movement therewith is a mercury switch 300 forming a part of an electric circuit designed to cause automatic actuation of the mechanism hereinbefore described, and which is also shown in the wiring diagram of Fig. 25. The mercury switch 300 is supported on the lever 293 by a strap 299, in such manner that when the rod 88 and shaft 230 are in clutching arrangement, as shown in Fig. 20, and the said clamp jaw 96 in cooperating gripping position with respect to the clamp jaw 94, the electric circuit through the said mercury switch will be broken so as to render ineffective the further automatic actuation of the apparatus.

It is also noted from the foregoing that, since the movement of the clamp jaw 96 into effective clamping position and the subsequent ejection of the stitching frame 85 are the last automatic operations in the cycle of operations for preparing the fabrics of one necktie for stitching, upon completion of such cycle the mercury switch will be in such last named angular position where the circuit for automatic action will be broken, and the apparatus will be rendered inactive.

In actual use of the apparatus herein described for assembling each set of necktie materials, the stitching frame 85 is therefore mounted on the machine while the jaws 94 and 96 are in closed position. After the ends of the rod 88 are placed in the open brackets 89 and with the forked end 235 in clutching engagement with the pins 233 and 234, the jaw 96 is then manually pivotally swung to open position, as shown in Fig. 6. Such movement of the jaw 96 will rotate the rod 88, which in turn will rotate the shaft 230 and cause the forked lever 293 to automatically angularly move the mercury switch 300 to an effective operative position, to permit of automatic actuation of the apparatus after a control or starting switch is closed. The friction slip connection between the parts 251 and 238c will permit of the above described manual rotation of the shaft 230 without causing rotation of the main cam shaft 140.

After the assembled necktie materials have been gripped between the jaws 94 and 96 of the stitching frame 85, stretched and locked in the manner hereinbefore described, the following mechanism is employed for automatically ejecting the said frame 85 with the lining 55 and folded fabric 50a from the apparatus, as shown in Fig. 15, so that the said necktie materials may be stitched.

Journaled in the brackets 305 is a shaft 306 (see Figs. 3, 10, 15 and 18). Fixed to the shaft 306 for rotation therewith are a pair of spaced ejector members 307, each having a cammed upper surface 307a. It is noted that the said cammed surface 307a is disposed underneath the rod 88 and is normally slightly spaced therefrom, as shown in Fig. 3. The ejectors 307 are so constructed and arranged that, upon rotation of the shaft 306 in a clockwise direction, portions of their surfaces 307a will contactively engage the stitching frame 85 and raise or lift the same until the rod 88 will be withdrawn from the open bearings 89. Upon continued further rotation of the shaft 306 in a clockwise direction, the ejectors will assume the position shown in Fig. 15, with the inner portion of the cammed surface 307a raised above the outer portion thereof, so that the stitching frame 85, having been freed from the bearings 89, will slidably ride on the cammed surface 307a to be ejected from the apparatus. In Fig. 15, the stitching frame 85 is shown having been ejected from the apparatus to a tilted platform 91 having an upstanding edge portion 91a to hold the said frame 85 on the platform 91.

The following means are employed, so synchronized with respect to the operation of closing the jaws of the clamp as previously described that at the proper time the shaft 306 will be automatically rotated to eject the stitching frame 85.

As shown in Figs. 3 and 15 of the drawings, there is mounted on the main cam shaft 140 a cam 308, having a specifically designed peripheral edge. Adapted to ride on the edge or rim of the cam 308 is a follower or roller 309 rotatably mounted on a lever 310, which in turn is pivotally mounted at one end thereof on the pivot shaft 311. To maintain the roller 309 in constant contactive engagement with the rim of the cam 308, a spring 312 is provided, having one end thereof fixed to the lever 310 and having the other end thereof fixed to a cross member of the apparatus. Fixed to the shaft 306 for rotation therewith is a link 315. Pivotally interconnecting the lever 309 and link 315 is a link 316.

It is thus seen from the above described construction that, when the main cam shaft 140 is rotated and as a high portion of the cam is approached, the lever 309 will cause the link 315 and the shaft 306 to rotate in a clockwise direction, to thereby rotate the ejectors 307 in a clockwise direction to eject the stitching frame in the manner above described. The cam 308 is so designed that, upon continued rotation thereof and after the ejectors have completed their assigned ejecting task, as in Fig. 15, the said ejectors 307 will be rotated in a counterclockwise direction, to be restored to their original position, as shown in Fig. 3.

As illustrated in Fig. 22a, when the clamp jaws 94 and 96 of the stitching frame 85 are in closed position, the pins 233 and 234 will be so positioned as to permit the free passage therebetween of the forked portions 235 and 236 of the rod 88, to permit the stitching frame to be freely ejected. The stitching frame 85 is so designed that, after being ejected from the apparatus, it may be mounted on a stitching machine, where the assembled necktie materials may be joined by a line 350 of loose stitching. Any suitable type of sewing machine may be employed, such as for example the type shown and described in the patent to Naftali, et al. No. Re. 19,683, dated July 23, 1935, or, if desired, the stitching may be done by hand.

In Fig. 19 of the drawings, there is illustrated the stitching frame 85 after it has been ejected from the apparatus and before the stitching operation is performed. It is noted that the teeth 97 of the clamp jaw 96 transversely cross the predetermined line of stitching, so that the loops of thread passing over the said teeth 97 will be loose upon removal of the necktie materials from the frame.

In Fig. 19a, the sewed together lining 55a, 55b and folded fabric 50a, by means of the line of stitching 350, are shown after removal from the stitching frame 85 and before being turned inside out or reversed in the manner well known to the art.

In accordance with this invention, automatically actuated means have also been provided for giving fullness to the necktie at the large end thereof. Such means is properly synchronized with the operation of the superimposing operation and with the stretching and clamping operation, and comprises the following mechanism.

As shown in Figs. 7, 7a, 13, 14 and 14a, an arm 400 is fixedly attached to the rod 185 (which also carries the fingers 180) for rotation therewith, the said arm 400 being disposed at the left hand end of the rod 185, or near the large end of the ultimate necktie. The upper end 400a of the arm 400 projects angularly with respect to the main portion thereof, and is provided with a reduced pin portion 401 having its axis parallel to the axis of the rod 185. The pin portion 401 is received in aligned elongated slots 400b formed in the upstanding walls of a flat pusher member 403. The pusher member 403 is, in turn, pivotally mounted on a pivot 404 fixed to an arm 405, which in turn is fixed to a rotatably mounted pivot 406 supported by the bracket 407. It is thus seen that, when the rod 185 is rotated in the manner hereinbefore described to operate the gripping fingers 180, the arm 400 will rotate to cause the pin 401 to rotate the pusher member 403 about its pivot 404, to thereby move the said pusher member 403 to a position where it will overlie the folded tie fabric 50a. In other words, the flat pusher member 403 is caused to be automatically moved from its ineffective dotted line position to its effective full line position, as shown in Fig. 14 of the drawings.

The following mechanism is provided, which is so synchronized with respect to the operation of the rod 185 that when the pusher member 403 is in the said effective full position, as shown in Fig. 14, it will be slidably moved forwardly to slightly push or move the uppermost layer of the folded fabric 50a with respect to the lowermost layer of the said folded tie fabric, to form a looped portion 408. It is this looped portion 408 which gives fullness to the large end of the necktie after it has been stitched, and thus enhances the appearance thereof by overlapping and hiding the stitches from view.

A cam 410 having a specifically designed peripheral contour is fixed to the main cam shaft 140 for rotation therewith. Adapted to ride on the rim of the cam 410 is a cam roller 411 rotatably mounted on a crank member 412, which in turn is pivotally mounted on the shaft 413, suitably supported in a bracket (not shown). A spring 414, having one end thereof attached to the crank member 412 and the other end anchored to the cross support of the apparatus, serves to maintain the roller 411 in constant engagement with the rim of the cam 410. A link 415 is provided, one end of which is fixedly attached to the pivot 406 and the other end of which is pivotally connected to the member 412 by a pivot 416 operating in the slotted apertures 412a and 415a in the members 412 and 415 respectively.

It is now apparent that when the main cam shaft 140 is caused to be rotated to effect the actuation of the rod 185, and the pusher member 403 is swung into effective position, the said pusher member 403 will be moved forwardly to cause looping of the necktie fabric, as hereinbefore described, due to the action of the crank member 412, the link 415 and the arm 405. It is noted that the slot 400b of the member 403 will permit free sliding movement of the member 403 with respect to the member 400.

The cam 410 is so designed that, upon continued rotation of the main cam shaft 140, the pusher member 403 will be restored to its original ineffective position.

To facilitate the formation of the loop 408, as above described, there is provided a spring member 417 fixed at one end thereof to the table surface 57 and having the free end slightly spaced from the table surface 57, so that the said free end of the spring member 417 will abut the hemmed edge of the tie fabric, as clearly shown in Fig. 14. This action will help to hold the lowermost layer of the folded fabric stationary, while permitting the movement of the uppermost layer with respect thereto. If desired, to further facilitate such relative movement between the folded fabric layers, the under surface of the flat pusher member bottom wall 403a and the upper surface of the spring member 417 may be roughened or otherwise provided with suitable cooperating frictional surfaces.

Also, if desired, a pair of resilient fingers 420 may be provided to retain the large end of the folded fabric against displacement until the pusher member 403 has been properly positioned, as shown in Fig. 14.

As clearly shown in Fig. 13, the fingers 420 are fixed at one of their ends to an arm 421, which in turn is fixed to the rod 185 for rotation therewith. In order to provide the proper timing for the actuation of the fingers 420, a separate cam 422 is provided, which is fixedly mounted on the main cam shaft 140. A cam follower or roller 423, rotatably mounted on an arm 424 of a crank, rides on the rim of the cam 422. Another arm 425 of the crank is provided with a rotatably mounted roller 426, which operates in a slotted passageway 427 of a link 428. The said link 428 is fixedly attached to the rod 185 for rotation therewith. The crank 424 is pivotally mounted on a pivot 429, which in turn is supported by the bracket 430. A spring 431 serves to maintain the roller 423 in constant engagement with the rim of the cam 422. The rotation of the cam shaft 140 will thus bring the fingers 420 into contactive engagement with the fabric 50a and restore them to inactive position, in accordance with predetermined timing.

In Fig. 25 of the drawings, there is shown a diagrammatic wiring diagram, illustrating the principle of automatic operation of the apparatus. The motor M which drives the worm gear shaft 153 (see Figs. 24 and 26) to cause rotation of the gear 152 is connected to a suitable source of current supply. A motor switch MS, shown in open position, controls the supply of current to the motor M.

When the switch MS is closed, the motor will start operation, but due to the fact that the main cam shaft 140 is normally in declutched position with respect to the gear 152, the said shaft 140 will not rotate. To cause rotation of the shaft 140, there is provided a solenoid 450 connected to the source of current supply by the shunt lead lines 451 and 452. The energization of the solenoid 450 is controlled by a solenoid switch S and the mercury switch 300. Both switches S and 300 are shown in open position. The mercury switch 300, as hereinbefore explained, will be tilted to effective closed position, as shown by the dotted lines, by the opening movement of the clamp jaw 96 of the stitching frame to open position (see Figs. 20 and 21). When the solenoid switch S is then closed, the solenoid 450 will be energized to cause clutching of the main shaft 140 with the gear 152 to drive the said main cam shaft 140. The arrangement of the solenoid action in clutching and unclutching may be of any suitable type known to the art, such as for example that shown in Figs. 26 to 29 of the drawings.

As previously explained, the arrangement of the various cams on the cam shaft 140, as shown in Fig. 4, is such that a complete cycle of automatic action will then take place, resulting in the proper folding, superimposing, stretching and clamping of the necktie materials on a stitching frame for sewing.

When the final automatic action of closing over the clamp jaw 96 and ejection of the stitching frame 85 takes place, it is noted that the mercury switch 300, due to such movement of the clamp jaw 96, will be tiltedly moved to its original position to break the circuit to the solenoid 450 to deenergize the same. The motor M will still be in operation, however, and after the stitching frame 85 has been relieved of its materials or a second stitching frame is properly mounted and the jaws opened, the mercury switch will then be in effective circuit closing position. After the operator has positioned a new lining 55 in the lining templet and a new fabric 50 in the fabric templet, the solenoid switch, which had been automatically opened after the completion of the previous cycle of operation, may be manually closed again to start a new cycle of automatic operations.

To facilitate the efficient use of the apparatus described herein, the following devices have been provided to support a supply of cut-to-pattern lining parts 55a and 55b.

As shown in Figs. 30 to 33, each such device comprises a bracket member 500 fixed to the front cross supporting member 501 of the apparatus by any suitable means, such as for example the machine screws 502. Fixed to the bracket 500 are a pair of vertically disposed, parallel bars 503 spaced from each other to form a trackway. Designed to slidably and captively ride in the trackway is a bar member 504 having channelled edges adapted to straddle the longitudinal edges of the bars 503. Fixed to the bar 504 is a lining carrier 505 having a flat plate 506, over which there are adapted to be looped a plurality of cut-to-pattern lining members 55a or 55b, in the manner shown in Fig. 31. It is noted that the upper ends of the bars 503 are disposed directly underneath the support 91 hereinbefore described in connection with the operation of the ejectors 307, and that an opening 507 is provided in the said support 91 to enable the operator to gain access to the linings on the carrier 505.

The following means are provided to normally urge the movement of the carrier member 506 in an upward direction, to thereby always dispose the uppermost lining member of the stock, adjacent the opening 507 for the convenience of the operator. A chain 508 is provided, one end of which is attached to the lower end of the bar 504 at 509, while the other end is attached to a winding drum 510 after passing over a roller 511 mounted on the bracket 500 and disposed at a predetermined vertical distance above the drum 510. A spring 512 fixed to the drum shaft 510a and to the drum 510 is provided to normally urge the rotation of said drum 510 to exert a pulling force on the chain 508, to thereby urge the carrier 505 to move in an upward direction. Thus, the linings looped over the carrier plate 506 are always in their uppermost position adjacent the opening 507.

To hold the stack of linings on the carriage plate 506, an overhanging plate 515 is provided at the upper end of the rods 503 disposed in the path of the carriage member 505, a bottom support 516 for the linings is provided and is fixed to the bracket 500 by means of the screws 517. To prevent lateral displacement of the stack of linings, a vertical rod member 518 is attached to the bottom support 516 and extends upwardly to the opening 507. The top of the rod 518 may be provided with an overhanging portion 518a, in alignment with the plate 515 and designed to assist the said plate 515 to prevent the linings from pushing up through the opening 507. The support 516 is provided with a slot 519, so that the rod 518 may be adjustably moved in accordance with the width of the particular lining employed. A lock nut 520 received on a threaded portion of the rod 518 serves to maintain the said rod in any desired position.

For loading the carrier plate 506 with linings, the platform 91, which may be pivotally attached to the apparatus by means of the pivot shafts 521 and the brackets 522, is first pivotally swung back or moved to the dotted line position shown in Fig. 30. The rod 518 is then rotated axially so that the top extending portion 518a is turned outwardly or away from the position shown in Fig. 30, to permit the loading of the linings on the carriage plate 506. The carriage is then moved downwardly to its lowermost position by unwinding the drum 510 against the action of the spring 512 and is maintained in such position by a spring pressed plunger 530 mounted in the support 516 and adapted to be received in a cooperating detent or opening 531 in one of the plates 503.

A handle 532 may be attached to the bottom end of the rod 518, to facilitate the axial rotation thereof.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In a method of making four-in-hand neckties from a fabric, those steps which consist of folding said fabric longitudinally and progressively stretching said folded fabric at a plurality of points beginning from a point adjacent one end thereof in a direction toward the opposite end thereof while maintaining the previously stretched portion of said fabric in stretched condition.

2. In a method of making four-in-hand neckties from a cut-to-pattern necktie fabric, those steps which consist of folding said fabric in a longitudinal direction to provide a pair of adjacently disposed fabric layers, moving a portion only of one of said fabric layers adjacent one end thereof with respect to the other of said layers and in a direction transverse to the length thereof, to form a loop portion, and confining said folded fabric in such condition before stitching the same, to thereby provide fullness to one end of the necktie.

3. In an apparatus for preparing previously cut-to-pattern necktie materials for stitching with a minimum of handling, a support for supporting a necktie fabric in unfolded condition, means associated with said fabric support for automatically folding said fabric with respect to a predetermined longitudinal fold line, a second support for supporting a lining, means for automatically relatively superimposing said folded fabric on said lining, and means for actuating said folding means and said superimposing means in properly timed relationship.

4. In an apparatus of the character described for making four-in-hand neckties from a previously cut-to-pattern tie fabric, a member for supporting said fabric in flat unfolded condition, a gauge on said supporting member for gauging said unfolded tie fabric with respect to its longitudinal axis, means for automatically folding said fabric on its longitudinal axis, a removably mounted stitching frame comprising a pair of cooperating jaws, means for automatically closing said jaws to clamp said folded fabric therebetween, and means to actuate said folding means and said jaw closing means in properly timed relationship.

5. In an apparatus of the character described for making four-in-hand neckties from a previously cut-to-pattern tie fabric, a member for supporting said fabric in flat unfolded condition, a gauge on said supporting member for gauging said unfolded tie fabric with respect to its longitudinal axis, means for folding said fabric substantially on its longitudinal axis, a removably mounted stitching frame, comprising a pair of cooperating jaws, means for automatically closing said jaws to clamp said folded fabric therebetween, and means for ejecting said stitching frame from its mounting after the said jaws have been closed.

6. In an apparatus of the character described for making four-in-hand neckties from a previously cut-to-pattern tie fabric, a member for supporting said fabric in flat unfolded condition, a gauge on said supporting member for gauging said unfolded tie fabric with respect to its longitudinal axis, means for longitudinally folding said fabric on said longitudinal axis, means for stretching said folded fabric in a longitudinal direction, and means for temporarily confining said folded fabric in such stretched condition.

7. In an apparatus of the character described for making four-in-hand neckties from a previously cut-to-pattern tie fabric, a member for supporting said fabric in flat unfolded condition, a gauge on said supporting member for gauging said unfolded tie fabric with respect to its longitudinal axis, means for longitudinally folding said fabric on its longitudinal axis, automatic means for stretching said folded fabric in a longitudinal direction, means for temporarily confining said folded fabric in such stretched condition, and means to actuate said folding means, said stretching means and said confining means in properly timed relationship.

8. In an apparatus of the character described, a pair of table members, gauging means on one of said table members adapted for manually positioning thereon a previously cut-to-pattern necktie fabric in flat unfolded condition and in relation to a predetermined longitudinal fold line, gauging means on the other of said table members adapted for manually positioning a necktie lining in flat unfolded condition, and means for causing said necktie fabric to be folded along said fold line and to then be relatively superimposed on said lining.

9. In an apparatus of the character described, a pair of table members, gauging means on one of said table members adapted for manually positioning thereon a previously cut-to-pattern necktie fabric in flat unfolded condition and in relation to a predetermined longitudinal fold line, gauging means on the other of said table members adapted for manually positioning a necktie lining in flat unfolded condition, means for causing said necktie fabric to be folded along said fold line, and means for transferring said folded necktie fabric to said lining table member.

10. In an apparatus of the character described, a pair of table members, gauging means on one of said table members adapted for manually positioning thereon a previously cut-to-pattern necktie fabric in flat unfolded condition and in relation to a predetermined longitudinal fold line, gauging means on the other of said table members adapted for manually positioning a necktie lining in flat unfolded condition, means for causing said necktie fabric to be folded along said fold line, and means for transferring said folded necktie fabric to said lining table member, said last named means including means for superimposing said folded fabric on said unfolded lining in relation to a predetermined line of stitching.

11. In an apparatus of the character described, a pair of table members, gauging means on one of said table members adapted for manually positioning thereon a previously cut-to-pattern necktie fabric in flat unfolded condition and in relation to a predetermined longitudinal fold line, gauging means on the other of said table members adapted for manually positioning a necktie lining in flat unfolded condition, means for causing said necktie fabric to be folded along said fold line, means for transferring said folded necktie fabric to said lining table member, said last named means including means for superimposing said folded fabric on said unfolded lining in relation to a predetermined line of stitching, and automatically actuated means for stretching said superimposed necktie fabric and lining in a longitudinal direction.

12. In an apparatus of the character described, a pair of table members, gauging means on one of said table members adapted for manually positioning thereon a previously cut-to-pattern necktie fabric in flat unfolded condition and in relation to a predetermined longitudinal fold line, gauging means on the other of said table members adapted for manually positioning a necktie lining in flat unfolded condition, means for causing said necktie fabric to be folded along said fold line, means for transferring said folded necktie fabric to said lining table member, said last named means including means for superimposing said folded fabric on said unfolded lining in relation to a predetermined line of stitching, means for stretching said superimposed necktie fabric and lining in a longitudinal direction, a removably supported stitching frame, and means for confining said fabric and lining on said frame in such superimposed, stretched condition.

13. In an apparatus of the character described, a pair of table members, gauging means on one of said table members adapted for manually positioning thereon a previously cut-to-pattern necktie fabric in flat unfolded condition and in relation to a predetermined longitudinal fold line, gauging means on the other of said table members adapted for manually positioning a necktie lining in flat unfolded condition, means for causing said necktie fabric to be folded along said fold line, means for transferring said folded necktie fabric to said lining table member, said last named means including means for superimposing said folded fabric on said unfolded lining in relation to a predetermined line of stitching, a removably supported stitching frame, and means for confining said folded fabric and unfolded lining in such superimposed condition.

14. In an apparatus of the character described, a pair of table members, gauging means on one of said table members adapted for manually positioning thereon a previously cut-to-pattern necktie fabric in flat unfolded condition and in relation to a predetermined longitudinal fold line, gauging means on the other of said table members adapted for manually positioning a necktie lining in flat unfolded condition, means for causing said necktie fabric to be folded along said fold line, means for transferring said folded necktie fabric to said lining table member, said last named means including means for superimposing said folded fabric on said unfolded lining in relation to a predetermined line of stitching, a removably supported stitching frame, means for confining said folded fabric and unfolded lining in such superimposed condition on said stitching frame, and means for ejecting said stitching frame from its support.

15. In an apparatus of the character described, a pair of table members, means for supporting said table members in fixed stationary position, gauging means on one of said table members adapted for manually positioning thereon a previously cut-to-pattern necktie fabric in flat unfolded condition and in relation to a predetermined longitudinal fold line, gauging means on the other of said table members adapted for manually positioning a necktie lining in flat unfolded condition, means for causing said necktie fabric to be folded along said fold line, and means for transferring said folded necktie fabric to said lining table member.

16. In an apparatus of the character described for making four-in-hand neckties from a previously cut-to-pattern tie fabric, a member for supporting said fabric in flat unfolded condition, a gauge on said supporting member for gauging said unfolded tie fabric with respect to its longitudinal axis, means for longitudinally folding said fabric on its longitudinal axis, means for stretching said folded fabric in a longitudinal direction, and means for temporarily confining said folded fabric in such stretched folded condition, said stretching means comprising a plurality of fingers adapted to contactively engage and grip said folded fabric.

17. In an apparatus of the character described for making four-in-hand neckties from a previously cut-to-pattern tie fabric, a member for supporting said fabric in flat unfolded condition, a gauge on said supporting member for gauging said unfolded tie fabric with respect to its longitudinal axis, means for longitudinally folding said fabric on its longitudinal axis, means for stretching said folded fabric in a longitudinal direction, and means for temporarily confining said folded fabric in such stretched folded condition, said stretching means comprising a plurality of fingers adapted to contactively engage and grip said folded fabric, said fingers being laterally movable in a direction along the length of said folded fabric.

18. In an apparatus of the character described for preparing necktie fabrics for stitching, a movable fabric carrier adapted to hold a longitudinally folded necktie fabric, a stitching frame comprising a pair of cooperating relatively movable jaw members, a support for said frame, said jaw members being adapted to be manually movable to open position, means for transferring said folded fabric from said carrier to overlie one of said jaw members while they are in open position, and means for closing said jaw members to confine said folded fabric therebetween.

19. In an apparatus of the character described for preparing necktie fabrics for stitching, a movable fabric carrier adapted to hold a longitudinally folded necktie fabric, a stitching frame comprising a pair of cooperating relatively movable jaw members, a support for said frame, said jaw members being adapted to be manually movable to open position, means for automatically transferring said folded fabric from said carrier to overlie one of said jaw members while they are in open position, and means for automatically closing said jaw members to confine said folded fabric therebetween.

20. In an apparatus of the character described for preparing necktie fabrics for stitching, a movable fabric carrier adapted to hold a longitudinally folded necktie fabric, a stitching frame comprising a pair of cooperating relatively movable jaw members, a support for said frame, one of said jaw members being adapted to be manually movable away from the other of said jaw members to separate said jaws, means for transferring said folded fabric from said carrier to overlie said relatively stationary jaw member, means for moving said movable jaw member to closed position to confine said fabric therebetween, and means for urging said first named relatively stationary jaw in a direction toward said moving jaw during such confining action.

21. In an apparatus of the character described for preparing necktie fabrics for stitching, a movable fabric carrier adapted to hold a longitudinally folded necktie fabric, a stitching frame comprising a pair of cooperating relatively movable jaw members, a support for said frame, one of said jaw members being adapted to be manually movable away from the other of said jaw members to separate said jaws, means for transferring said folded fabric from said carrier to overlie said relatively stationary jaw member, means for moving said movable jaw member to closed position to confine said fabric therebetween, means for urging said first named relatively stationary jaw in a direction toward said moving jaw during such confining action, and releasable means for locking said jaw members in said last named fabric confining position.

22. In an apparatus of the character described for preparing necktie fabrics for stitching, an electric circuit including a movable switch member, a stitching frame comprising a pair of cooperating jaw members, means to automatically close said jaw members, said last named means having an open jaw position and a closed jaw position, means to prevent said means from automatically assuming its open jaw position, and means to open said switch member when said jaw closing means is in closed jaw position.

23. In a method of making four-in-hand neckties from a fabric, those steps which consist of folding said fabric longitudinally, incrementally stretching said folded fabric in a longitudinal direction throughout the portion thereof to be traversed by an ultimate line of stitching while maintaining the incrementally stretched parts of said fabric stretched until said entire portion is in stretched condition, and maintaining said fabric in such stretched condition until same is stitched.

24. In an apparatus of the character described for preparing previously cut-to-pattern necktie materials for stitching with a minimum of handling, a support for supporting a necktie fabric in unfolded condition, means associated with said fabric support for folding said fabric with respect to a predetermined longitudinal fold line, a second support for supporting the lining, means for relatively superimposing said folded fabric on said lining, a single release means, and means operable upon actuation of said single release means to automatically and sequentially motivate said folding means and said superimposing means.

JAMES J. McGINLEY.